(12) United States Patent
Izuta et al.

(10) Patent No.: US 11,190,745 B2
(45) Date of Patent: Nov. 30, 2021

(54) IMAGE PROCESSING APPARATUS AND IMAGE PROCESSING METHOD

(71) Applicant: SONY CORPORATION, Tokyo (JP)

(72) Inventors: Osamu Izuta, Tokyo (JP); Manli Yuan, Kanagawa (JP); Ayumi Tadano, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/758,734

(22) PCT Filed: Aug. 28, 2018

(86) PCT No.: PCT/JP2018/031736
§ 371 (c)(1),
(2) Date: Apr. 23, 2020

(87) PCT Pub. No.: WO2019/087547
PCT Pub. Date: May 9, 2019

(65) Prior Publication Data
US 2020/0374501 A1 Nov. 26, 2020

(30) Foreign Application Priority Data

Nov. 2, 2017 (JP) .............................. JP2017-212790

(51) Int. Cl.
*H04N 9/73* (2006.01)
*H04N 5/243* (2006.01)
*H04N 9/64* (2006.01)

(52) U.S. Cl.
CPC ............ *H04N 9/735* (2013.01); *H04N 5/243* (2013.01); *H04N 9/643* (2013.01)

(58) Field of Classification Search
CPC ....................................................... H04N 9/735
USPC ....................................................... 348/224.1
See application file for complete search history.

(56) References Cited

U.S. PATENT DOCUMENTS

| 2009/0002518 A1* | 1/2009 | Nakamura | ............. H04N 9/735 |
| | | | 348/223.1 |
| 2012/0086830 A1* | 4/2012 | Ichikawa | ............. H04N 5/2355 |
| | | | 348/223.1 |
| 2012/0218439 A1 | 8/2012 | Ueda et al. | |
| 2014/0009683 A1 | 1/2014 | Yoshida | |

FOREIGN PATENT DOCUMENTS

| CN | 102447912 A | 5/2012 |
| CN | 102651818 A | 8/2012 |
| CN | 103533316 A | 1/2014 |

(Continued)

OTHER PUBLICATIONS

International Search Report and Written Opinion of PCT Application No. PCT/JP2018/031736, dated Oct. 30, 2018, 11 pages of ISRWO.

*Primary Examiner* — Joel W Fosselman
(74) *Attorney, Agent, or Firm* — Chip Law Group

(57) ABSTRACT

A controlling value is calculated using a first white balance gain and a second white balance gain. Using the calculated controlling value, an image processing parameter is then modulated. Using this modulated image processing parameter, image data processing is performed, and storage, transmission, and the like of the image processing parameter are performed. This can realize advanced image processing reflective of the white balance gain.

18 Claims, 18 Drawing Sheets

(56) References Cited

FOREIGN PATENT DOCUMENTS

| | | |
|---|---|---|
| EP | 2493200 A1 | 8/2012 |
| JP | 2008-113445 A | 5/2008 |
| JP | 2011-078137 A | 4/2011 |
| JP | 2011-166607 A | 8/2011 |
| JP | 2012-085043 A | 4/2012 |
| JP | 2012-165147 A | 8/2012 |
| JP | 2012-178788 A | 9/2012 |
| JP | 2014-014044 A | 1/2014 |
| JP | 2014-168120 A | 9/2014 |

* cited by examiner

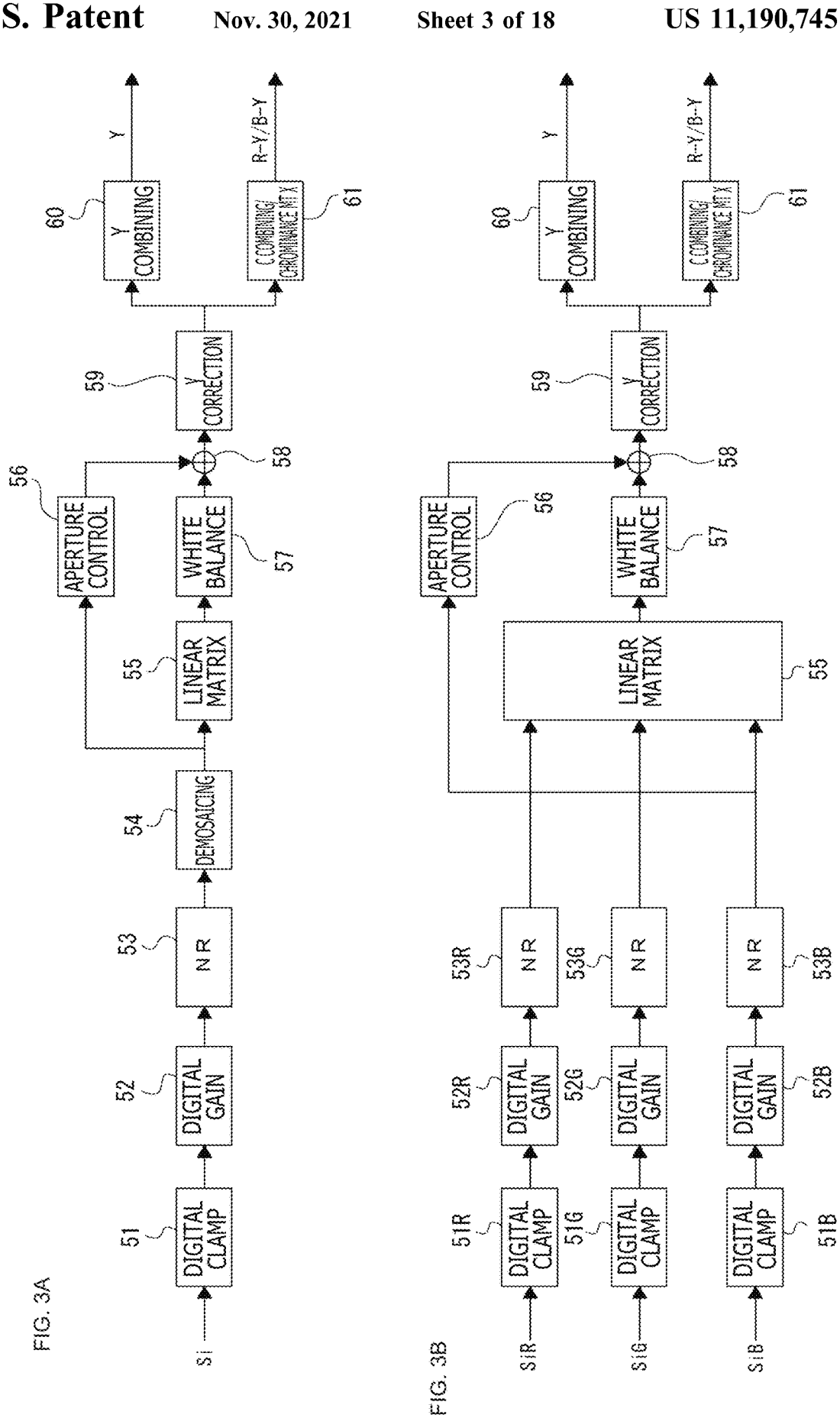

IMAGE PROCESSING APPARATUS AND IMAGE PROCESSING METHOD

CROSS REFERENCE TO RELATED APPLICATIONS

This application is a U.S. National Phase of International Patent Application No. PCT/JP2018/031736 filed on Aug. 28, 2018, which claims priority benefit of Japanese Patent Application No. JP 2017-212790 filed in the Japan Patent Office on Nov. 2, 2017. Each of the above-referenced applications is hereby incorporated herein by reference in its entirety.

TECHNICAL FIELD

The present technology relates to an image processing apparatus, an image processing method, and a program, and particularly relates to control over a parameter for various kinds of image processing.

BACKGROUND ART

While there are known technologies related to various kinds of image processing, the following documents are known as, for example, a technology for modulating a parameter used in processing related to color reproduction.

PTL 1 discloses a technology for modulating a color reproduction parameter according to a plurality of luminance ranges.

PTL 2 discloses a technology for modulating a color reproduction parameter by estimating a scene from a luminance and a camera posture.

PTL 3 discloses a technology for modulating a color reproduction parameter according to position information obtained by a GPS (Global Positioning System).

PTL 4 discloses a technology for modulating a color reproduction parameter according to an image generation history and brightness information regarding a subject.

CITATION LIST

Patent Literature

[PTL 1]
  JP 2014-168120A
[PTL 2]
  JP 2012-165147A
[PTL 3]
  JP 2011-166607A
[PTL 4]
  JP 2008-113445A

SUMMARY

Technical Problem

In the meantime, while processing for eliminating influence of a tint of a light source by white balance adjustment is normally performed as image processing, the tint of the light source is sometimes left uncancelled on purpose or the tint of the light source is sometimes actively used as a photographic expression. Nevertheless, a technology for performing image processing according to such a state of white balance adjustment is not known.

The present technology, therefore, provides a technology for modulating a parameter for image processing according to a state of white balance adjustment (a white balance gain).

Solution to Problem

An image processing apparatus according to the present technology includes a controlling value calculation section that calculates a controlling value using a first white balance gain and a second white balance gain, and a parameter modulation section that modulates an image processing parameter using the controlling value calculated by the controlling value calculation section.

As a white balance gain used in white balance control to correct tones of colors of an image with respect to various light source colors at a time of image capturing, a white balance gain is basically set to cancel the colors of a light source. Yet, setting a different white balance gain makes it possible to adjust more diverse tones of colors. With the above configuration, two kinds of white balance gains are used to calculate the controlling value, and a parameter of some sort used in a course of image processing is modulated using the controlling value.

In the image processing apparatus according to the present technology described above, the controlling value calculation section may also perform processing for calculating the first white balance gain according to an image to be processed.

While the first white balance gain may be a fixed value or one of several values stored, a white balance gain to, for example, adjust the image to be processed in such a manner that the light source is in a predetermined color temperature is calculated from the image to be processed.

In the image processing apparatus according to the present technology, the controlling value calculation section may also perform processing for calculating the second white balance gain according to an image to be processed.

While the second white balance gain may be a fixed value or one of several values stored, a white balance gain to, for example, adjust the image to be processed in such a manner that the light source is in a predetermined color temperature (a value different from the first white balance gain) is calculated from the image to be processed.

In the image processing apparatus according to the present technology, the first white balance gain may be a white balance gain to adjust an image to be processed in a direction of cancelling a tint of a light source at a time of capturing the image to be processed, the second white balance gain may be a white balance gain to adjust the image to be processed in a direction of leaving the tint of the light source uncancelled, compared with the first white balance gain, and the controlling value calculated by the controlling value calculation section may be a controlling value reflective of a tint remaining amount of the light source.

When the first white balance gain is set to a value for white balance adjustment to, for example, completely or greatly cancel the tint of the light source, the second white balance gain is set to a value for white balance adjustment to leave the tint of the light source uncancelled to some extent. In such case, the controlling value reflective of the tint remaining amount in the case of performing white balance adjustment using the second white balance gain can be obtained from the first and second white balance gains.

The image processing apparatus according to the present technology may include an image signal processing section that performs processing on image data using the image processing parameter modulated using the controlling value.

Diverse contents of processing performed on the image data including colors, luminance, contrast, sharpness, and the like of the image data are assumed. Furthermore, diverse purposes of the processing performed on the image data including, for example, development, storage, reproduction, transmission, printing, and display of images are assumed.

The image processing parameter used in such various kinds of image data processing is modulated by the controlling value generated using the white balance gains. The image signal processing section performs predetermined image processing by the modulated image processing parameter.

The image processing apparatus according to the present technology may include an output processing section that performs processing for outputting the image processing parameter modulated using the controlling value as information to be stored in a storage medium.

The output processing section stores the image processing parameter as, for example, the image processing parameter that can be used for image data to be processed. It is assumed that the image processing parameter is stored either together with or to be associated with the image data.

The image processing apparatus according to the present technology may include an output processing section that performs processing for outputting the image processing parameter modulated using the controlling value as information to be transmitted to an external apparatus.

The output processing section transmits the image processing parameter to the external apparatus as, for example, the image processing parameter that can be used for image data to be processed. It is assumed that the image processing parameter is transmitted either together with or to be associated with the image data.

In the image processing apparatus according to the present technology, the controlling value calculation section may set the second white balance gain using user input information.

The second white balance gain is set to a value reflective of user's intention which is, for example, a value set by user's operation.

The image processing apparatus according to the present technology may include an image analysis section, and calculation of the controlling value by the controlling value calculation section and modulation of the image processing parameter by the parameter modulation section may be executed according to an analysis result of the image analysis section.

For example, face detection or the like is performed by image analysis, and the image processing parameter used in processing an image to be processed is modulated in a case of detecting a face in the image to be processed.

The image processing apparatus according to the present technology may include an image analysis section, and the image signal processing section may use the image processing parameter modulated by the parameter modulation section for signal processing on an area identified by an analysis result of the image analysis section within the image to be processed.

For example, face detection or the like is performed by image analysis, and the modulated image processing parameter is used for signal processing with respect to an area of a face image in a case of detecting a face in the image to be processed.

In the image processing apparatus according to the present technology, calculation of the controlling value by the controlling value calculation section and modulation of the image processing parameter by the parameter modulation section may be executed according to an operating state of a light-emitting apparatus at a time of capturing the image to be processed.

For example, in a case of emitting light from the light-emitting apparatus at the time of image capturing, the image processing parameter used in processing the captured image is modulated.

In the image processing apparatus according to the present technology, the first white balance gain may be a white balance gain used in a first white balance mode for cancelling a tint of a light source at a time of capturing an image to be processed, the second white balance gain may be a white balance gain used in a second white balance mode for leaving the tint of the light source uncancelled at the time of capturing the image to be processed, and the controlling value calculation section may calculate the controlling value in a case in which an image for which the second white balance mode is selected for white balance adjustment is the image to be processed.

For example, in a case in which a white balance mode other than an ordinary white balance mode is selected, the controlling value is calculated.

In the image processing apparatus according to the present technology, the image processing parameter modulated using the controlling value may be a parameter used in color processing performed on image data.

As the color processing, a parameter for adjustment or the like of a hue or saturation is modulated according to the white balance gain.

In the image processing apparatus according to the present technology, the image processing parameter modulated using the controlling value may be a parameter used in processing for modulating a specific hue of the image data.

The parameter used in processing for shifting pixel data in a specific hue area to a specific hue or adjusting saturation of the specific hue area is modulated according to the white balance gain.

In the image processing apparatus according to the present technology, the image processing parameter modulated using the controlling value may be a parameter used in development processing other than color processing.

For example, a development processing parameter (for example, parameter for luminance processing) other than the color processing parameter, such as a parameter using contrast (gamma correction), brightness, sharpness, or a tone curve is modulated according to the white balance gain.

An image processing method according to the present technology executes, as an image processing method executed by an arithmetic processor, a controlling value calculation procedure of calculating a controlling value using a first white balance gain and a second white balance gain, and a parameter modulation procedure of modulating an image processing parameter using the controlling value calculated in the controlling value calculation procedure.

With this method, image processing based on a white balance gain is executed.

A program according to the present technology is a program causing an arithmetic processor to execute the above processing.

Advantage Effects of Invention

According to the present technology, it is possible to provide an unprecedented image processing scheme that is image processing (for example, image adjustment and an image effect) based on a white balance gain and to facilitate generation of a more advanced image.

It is noted that the advantages of the present technology are not necessarily limited to those described herein and may be any of advantages described in the present disclosure.

BRIEF DESCRIPTION OF DRAWINGS

FIGS. 3A and 3B depict block diagrams depicting some of the functions of an image signal processing section according to the embodiment.

DESCRIPTION OF EMBODIMENTS

Embodiments will hereinafter be described in the following order.
<1. Configuration of imaging apparatus>
<2. Parameter modulation based on tint remaining amount>
<3. Examples of applicable processing>
<4. Example of application to printer>
<Conclusion and modifications>
<1. Configuration of Imaging Apparatus>

Figure 1:
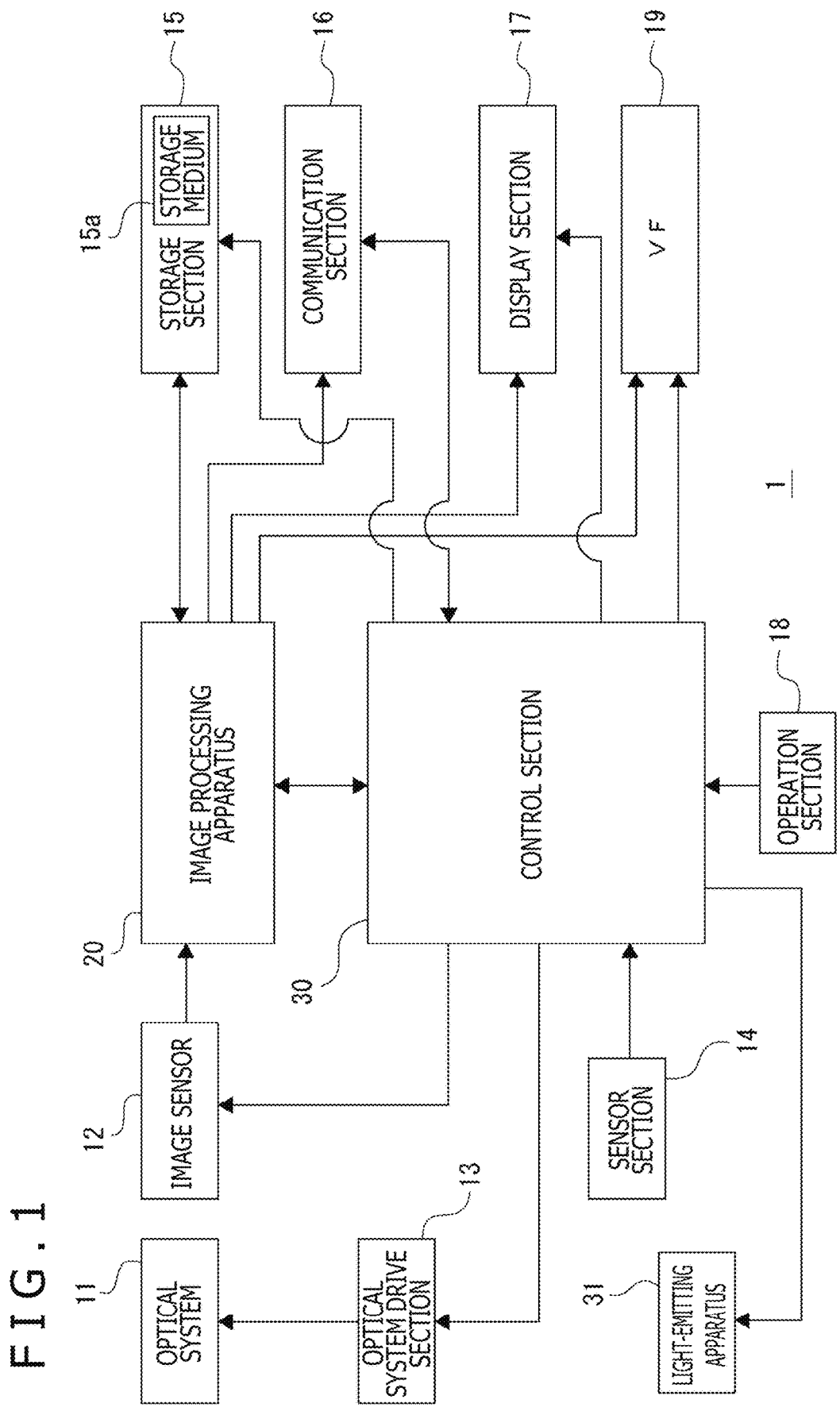
FIG. 1 is a block diagram of an imaging apparatus according to an embodiment of the present technology.

A configuration of an imaging apparatus mounting therein an image processing apparatus according to the present technology will hereinafter be described as a first embodiment. FIG. 1 is a block diagram of an imaging apparatus 1. It is noted that, in this example, an image processing apparatus 20 of FIG. 1 corresponds to an image processing apparatus set forth in the claims.

As depicted in FIG. 1, the imaging apparatus 1 includes an optical system 11, an image sensor 12, an optical system drive section 13, a sensor section 14, a storage section 15, a communication section 16, a display section 17, an operation section 18, an electronic viewfinder 19, the image processing apparatus 20, and a control section 30.

The optical system 11 includes a cover lens, a focus lens, a zoom lens, a condensing lens, a diaphragm mechanism, and the like. The optical system 11 condenses light from a subject on the image sensor 12.

The image sensor 12 has an image pickup device of, for example, a CCD (Charge Coupled Device) type or a CMOS (Complementary Metal Oxide Semiconductor) type, and a peripheral circuit system reading out electric charges from the image pickup device.

Light-receiving pixels in the image sensor 12 are made into R (red), G (green), and B (blue) light-receiving pixels by color filters in, for example, a Bayer color array. It is noted that, needless to say, the array of the R, G, and B pixels may be other than the Bayer color array.

Alternatively, three image sensors corresponding to R, G, and B may be provided as 3CCD or 3CMOS type and imaging signals corresponding to R, G, and B may be output in parallel.

Signals read out from the image sensor 12 are supplied to the image processing apparatus 20 as imaging signals of the subject.

A signal transfer action and an electronic shutter speed of the image sensor 12 are controlled by the control section 30.

The optical system drive section 13 drives the focus lens in the optical system 11 on the basis of control by the control section 30, and executes a focusing action. Furthermore, the optical system drive section 13 drives the diaphragm mechanism in the optical system 11 on the basis of the control by the control section 30 to execute exposure adjustment, and drives the zoom lens to execute a zooming action.

The image processing apparatus 20 includes, for example, an arithmetic processor such as a DSP (Digital Signal Processor) or a microcomputer. The image processing apparatus 20 performs various kinds of signal processing on the imaging signals from the image sensor 12.

For example, the image processing apparatus 20 executes CDS (Correlated Double Sampling) processing, AGC (Automatic Gain Control) processing, and the like on electrical signals obtained by photoelectric conversion in the image sensor 12, and further performs A/D (Analog/Digital) conversion processing.

Furthermore, the image processing apparatus 20 performs various kinds of processing while sequentially buffering digitalized imaging signals (image data). The image processing apparatus 20 performs, for example, noise reduction processing, Y/C processing, color correction processing, contour enhancement processing, resolution conversion processing, codec processing as formatting for storage and data compression, and the like, on image data.

It is noted that the imaging apparatus 1 is sometimes configured such that the image sensor 12 performs processing up to the A/D conversion processing and that the image processing apparatus 20 receives the digitalized imaging signals (image data).

The storage section 15 stores the image data as a still image or a moving image generated by the image processing apparatus 20 in a storage medium 15a on the basis of control by the control section 30. The storage medium 15a refers to a storage medium that stores the image data permanently (not temporarily).

The storage medium 15a may be either a detachable medium such as a memory card, an optical disk, or a magnetic tape, or a fixed medium such as an HDD (Hard Disk Drive) or a semiconductor memory module.

The communication section 16 performs communication with an external apparatus that is not depicted either wiredly or wirelessly, on the basis of control by the control section 30. In other words, the communication section 16 performs transmission of the captured image data, the image data read out from the storage medium 15a, additional information regarding these pieces of image data, and yet other control data to the external apparatus, reception of various kinds of data from the external apparatus, and the like.

The imaging apparatus 1 can thereby output the image data and the like to the external apparatus that is not depicted, and reproduce and edit image data captured by the external apparatus.

In a case of wireless communication, the communication section 16 may perform communication according to a communication scheme compliant with wireless communication standards which include, for example, Wi-Fi (registered trademark) and Bluetooth (registered trademark).

Furthermore, the communication section 16 can perform wired communication using a connector cable such as a USB (Universal Serial Bus). Moreover, the communication section 16 may be configured to perform communication using any of various networks such as the Internet, a home network, and a LAN (Local Area Network) and perform transmission and reception of various kinds of data with a server on the network, a terminal, or the like.

The operation section 18 comprehensively indicates an input function to which a user's operation is input. For example, operators such as various operation buttons and operation dials including a release button, a zoom button, and menu operation keys that are provided on a casing of the imaging apparatus 1 are comprehensively denoted as the operation section 18. Moreover, in a case of providing other operation input sections such as receiving sections of a touch panel and a remote controller, those sections are one aspect of the operation section 18.

Operation information obtained by the operation section 18 is supplied to the control section 30. The control section 30 exercises necessary control according to the operation information.

The display section 17 is a display section that provides various kinds of indications to a user, and is formed to have, for example, a display device such as an LCD (Liquid Crystal Display) or an organic EL (Electro-Luminescence) display formed on the casing of the imaging apparatus 1.

Moreover, the electronic viewfinder 19 is also formed using an LCD or an organic EL display, and presents an image and information to a user in a manner complementary with the display section 17.

Image data regarding a resolution-converted captured image for display is supplied to the display section 17 and the electronic viewfinder 19 from the image processing apparatus 20. The display section 17 and the electronic viewfinder 19 each display the image data regarding the captured image. The user can thereby check what is generally called a through image (monitoring image of a subject during standby for storage).

Moreover, image data reproduced in the storage section 15 can be supplied to the display section 17 and the electronic viewfinder 19 via the image processing apparatus 20, and displaying the image data enables the user to check a reproduced image of the captured and stored image.

Furthermore, the display section 17 and the electronic viewfinder 19 each execute display of various operation menus, icons, and messages, that is, display as a GUI (Graphical User Interface), on a screen on the basis of instructions from the control section 30.

It is noted that an optical finder is sometimes provided in the imaging apparatus 1 as an alternative to the electronic viewfinder 19. The optical finder is, for example, provided in a case in which the imaging apparatus 1 is what is generally called a single-lens reflex camera.

The sensor section 14 comprehensively indicates various sensors. Specifically, a gyro sensor for detecting a posture of the imaging apparatus 1 and, for example, camera shake, an acceleration sensor for detecting a moving acceleration and a gravity direction of the imaging apparatus 1, and the like are sometimes provided. Furthermore, an illuminance sensor detecting an external illuminance for exposure adjustment and the like, a range sensor measuring a subject distance, and the like may be provided.

The various sensors as the sensor section 14 transmit detection signals to the control section 30. The control section 30 can exercise various kinds of control using information detected by the sensor section 14.

The control section 30 is configured by a microcomputer (arithmetic processor) including, for example, a CPU (Central Processing unit), a ROM (Read Only Memory), a RAM (Random Access Memory), and a flash memory.

The control section 30 totally controls the overall imaging apparatus 1 by causing the CPU to execute programs stored in the ROM, the flash memory, or the like.

The RAM is used as a work area when the CPU performs various kinds of data processing, to temporarily store data, programs, and the like.

The ROM and the flash memory (nonvolatile memory) are used to store application programs for various actions, firmware, and the like in addition to an OS (Operating System) for the CPU to control various sections and content files such as image files.

The control section 30 exercises control over actions of the sections based on instructions on various kinds of signal processing and the like in the image processing apparatus 20 and user's operations. These actions include an imaging action and storage and reproduction actions of the storage section 15, camera actions such as focusing/exposure adjustment, exposure/read out actions of the image sensor 12, a communication action of the communication section 16 with an external apparatus, and display actions of the display section 17 and the electronic viewfinder 19.

It is noted that the image processing apparatus 20 and the control section 30 may be integrated into a one-chip microcomputer or the like.

The light-emitting apparatus 31 is what is generally called a flash light-emitting apparatus, and performs a light-emitting action at release timing on the basis of an instruction from the control section 30. In other words, in a case where a user selects a mode for emitting flash light (particularly in a case of dark surroundings), the light-emitting apparatus 31 receives a light-emitting trigger signal at the release timing from the control section 30, and performs a light-emitting action on the basis of the light-emitting trigger signal.

It is noted that the light-emitting apparatus 31 may be an apparatus that continuously emits light (give continuous illumination) instead of an apparatus emitting flash light.

Furthermore, the light-emitting apparatus 31 may be incorporated in the imaging apparatus 1 or may be separated from the imaging apparatus 1 and used by being attached to the imaging apparatus 1.

Figure 2:
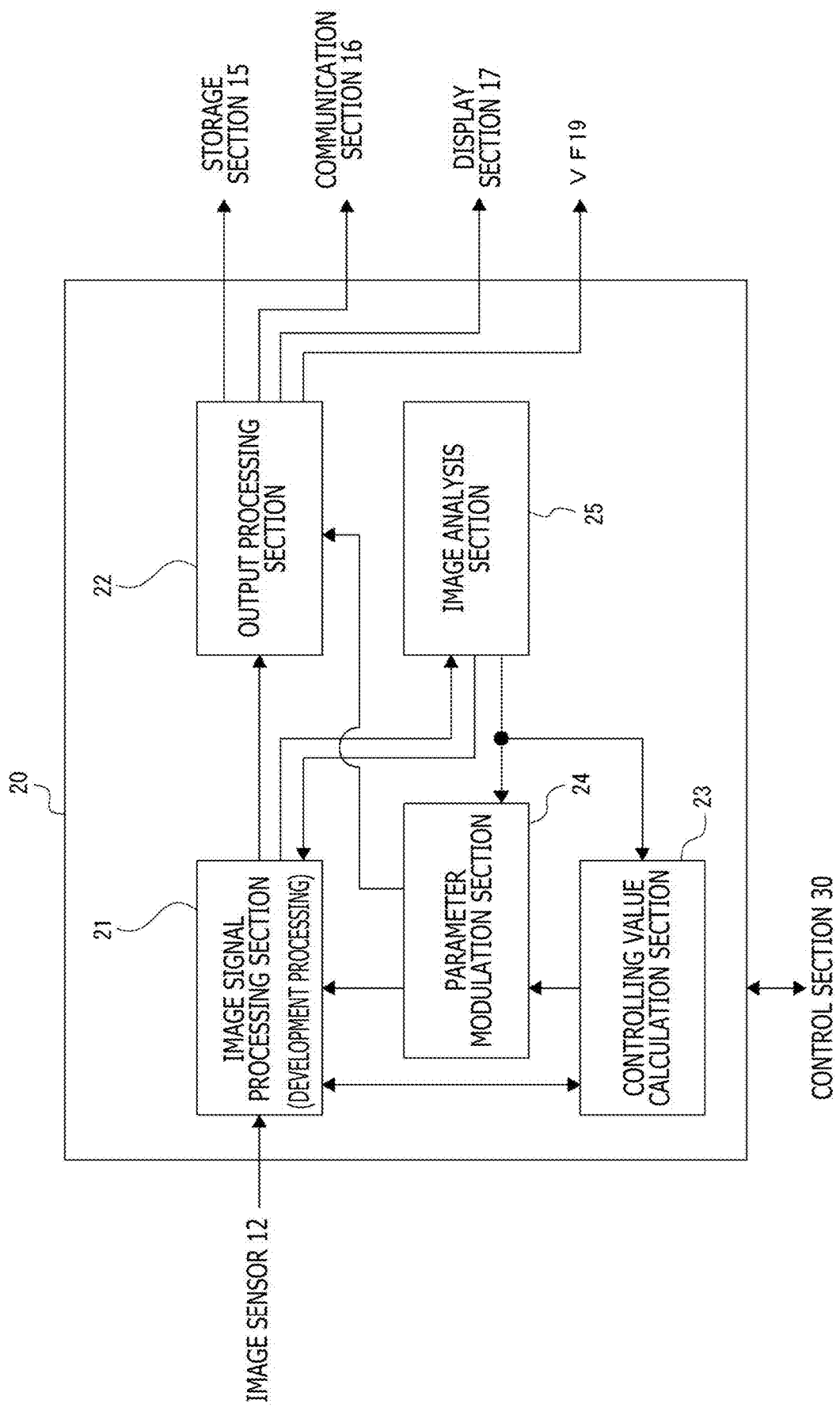
FIG. 2 is a block diagram depicting functions of an image processing apparatus according to the embodiment.

FIG. 2 depicts a functional configuration of the image processing apparatus 20.

The image processing apparatus 20 including, for example, the DSP or the microcomputer is configured to execute processing functions depicted in FIG. 2 by, for example, software. It is noted that all or some of the functions described below may be configured by hardware.

The image processing apparatus 20 includes an image signal processing section 21, an output processing section 22, a controlling value calculation section 23, a parameter modulation process 24, and an image analysis section 25.

Imaging signals from the image sensor 12 are input to the image signal processing section 21, and the image signal processing section 21 mainly performs development processing. For example, the image signal processing section 21 performs various kinds of color processing and luminance processing as RAW image processing, Y/C processing, and RGB data processing.

Specifically, the image signal processing section 21 reads out the photoelectrically converted signals from the image sensor 12 to obtain the digitalized data, and generates image data as a RAW image.

Furthermore, the image signal processing section 21 performs on the RAW image data necessary signal processing such as noise reduction processing, white balance adjustment, gamma processing, Y/C processing, color correction processing, contour enhancement processing, and resolution conversion processing to generate developed image data.

The output processing section 22 performs processing for storage output and transmission output with respect to the developed image data. For example, the output processing section 22 performs storage formatting and compression processing (for example, JPEG (Joint Photographic Experts Group) codec) on the image data with respect to storage of the image data, and then performs processing of generating image file data in a storage format to contain various kinds of additional information and transferring the image file data to the storage section 15.

Moreover, the output processing section 22 performs compression processing for communication output on the image file data, communication format processing so that the image file data contains the additional information, and transfer processing for transferring the image file data to the communication section 16, and the like.

Furthermore, the output processing section 22 performs processing for displaying the image file data on the display section 17 and the electronic viewfinder 19. For example, the output processing section 22 reads out the image data from the storage section 15 and performs the resolution conversion, character image combining for display, and the like to generate image data to be displayed, and thereby transfers the image data to the display section 17 and the electronic viewfinder 19.

The controlling value calculation section 23 performs processing for calculating a controlling value using a first white balance gain and a second white balance gain. The first white balance gain is, for example, a white balance gain for adjusting an image in a direction of cancelling a tint of a light source at a time of capturing the image. For example, while the first white balance gain may be assumed to be a gain value for completely cancelling the tint of the light source, the first white balance gain may be a gain value for performing white balance to some extent.

The second white balance gain is a white balance gain for adjusting an image in a direction of leaving uncancelled the tint of the light source at the time of image capturing, compared with the first white balance gain. The second white balance gain is a gain value used in image expression so that the tint of the light source is left uncancelled.

In addition, the controlling value is a value reflective of, for example, a tint remaining amount.

The parameter modulation process 24 performs processing for modulating an image processing parameter using the controlling value calculated by the controlling value calculation section 23. Various parameters are assumed to be the image processing parameter to be modulated. Examples of the image processing parameter include an offset value for processing for changing color reproduction of a specific hue, a compression value, coefficients (matrix) in linear matrix processing, contrast processing coefficients, and sharpness processing coefficients to be described later.

An example of processing performed by the controlling value calculation section 23 and the parameter modulation process 24 will be described later in detail.

The image analysis section 25 performs analysis processing on the captured image and obtains a predetermined analysis result. For example, the image analysis section 25 determines whether or not a subject contains a person's face as a face detection or the like, and performs scene discrimination, brightness discrimination, specific subject discrimination, and the like.

The image analysis result is referred to by the image signal processing section 21, the controlling value calculation section 23, and the parameter modulation process 24, and is sometimes used in the processing.

Each of these functions sometimes performs predetermined processing by communicating with the control section 30.

As the functions of the image processing apparatus 20, functions other than those depicted in FIG. 2 are sometimes provided, but all of the functions depicted in FIG. 2 are not necessarily required to be provided.

Next, FIGS. 3A and 3B depict examples of some of configurations included in the image signal processing section 21 of FIG. 2. FIGS. 3A and 3B exemplarily depict flows of processing from an input stage of the imaging signals from the image sensor 12 to processing of luminance (Y) and chrominances (R-Y, B-Y).

FIG. 3A depicts a case of a 1 CCD or 1 CMOS image sensor 12, and FIG. 3B depicts a case of a 3 CCD or 3 CMOS image sensor 12.

It is noted that it is assumed that input image data Si depicted here is image data (RAW image data) already digitalized by the image sensor 12 side or the image signal processing section 21.

As depicted in FIG. 3A, in the case of the 1 CCD or 1 CMOS image sensor 12, a digital clamp circuit 51 performs clamp processing on the image data Si from the image sensor 12, a digital gain circuit 52 applies a gain to the resultant image data Si, and a noise reduction circuit 53 performs noise reduction processing on the resultant image data Si. Then, a demosaicing section 54 performs demosaicing processing for obtaining three pieces of image data as R information, G information, and B information.

A linear matrix processing section 55 and an aperture control processing section 56 perform processing on the R, G, and B information obtained by the demosaicing processing.

It is noted that while the demosaicing processing is illustrated as an example of color separation, the demosaicing processing is performed in a case of using, for example, mosaic color filters in the Bayer array or the like. In a case of using, for example, stripe color filters, another color separation processing is performed.

The linear matrix processing section 55 performs processing for correcting colors of the image data by multiplying the image data (R, G, and B) by a color reproduction coefficient. Processing for deciding the color reproduction coefficient, processing for storing the color reproduction coefficient, and processing for multiplying the image data by the color reproduction coefficient are therefore performed.

A white balance processing section 57 performs white balance adjustment processing, that is, processing for correcting color data concerning each pixel to a value based on a predetermined color temperature of the light source, on the image data (R, G, and B) processed by the linear matrix processing section 55. Specifically, the white balance processing section 57 multiplies the image data by a white balance gain.

The aperture control processing section 56 performs processing for enhancing a contour by enhancing high frequency components, on the image data, that is, the R, G, and B information obtained by the demosaicing processing.

An output from the white balance processing section 57 and an output from the aperture control processing section 56 are mixed up by a mixer 58, and the mixture is supplied to a gamma correction section 56.

The gamma correction section 56 performs gray level correction on the image data according to gray level characteristics of a reproduction display system such as a display apparatus that is not depicted.

The gamma-corrected image data is supplied to a Y combining section 60 and C combining/chrominance matrix section 61. The Y combining section 60 combines Y (luminance) signals and outputs the combined Y signal to a luminance signal processing system in rear of the Y combining section 60. The C combining/chrominance matrix section 61 generates chrominance signals (R-Y signal and B-Y signal) and outputs the chrominance signals to a chrominance signal processing system in rear of the C combining/chrominance matrix section 61.

In the case of the 3 CCD or 3 CMOS image sensor depicted in FIG. 3B, digital clamp circuits 51R, 51G, and 51B perform clamp processing on image data SiR, SiG, and SiB from three image pickup devices corresponding to R, G, and B, digital gain circuits 52R, 52G, and 52B apply gains to the resultant image data SiR, SiG, and SiB, and noise reduction circuits 53R, 53G, and 53B perform noise reduction processing on the resultant image data SiR, SiG, and SiB, respectively. The image data (R, G, and B) in this state is supplied to the linear matrix processing section 55 and the aperture control processing section 56. Subsequent processing is similar to that depicted in FIG. 3A.

<2. Parameter Modulation Based on Tint Remaining Amount>

Parameter modulation based on a tint remaining amount performed by the abovementioned imaging apparatus 1 (image processing apparatus 20) will be described below.

First, a setting screen for a white-balance-inclusive image processing mode in the imaging apparatus 1 will first be described with reference to FIG. 4A. This setting screen is an example of a screen that is displayed on, for example, the display section 17 and that is used for the user to optionally set a mode by the user's operation of the operation section 18.

Figure 4A:
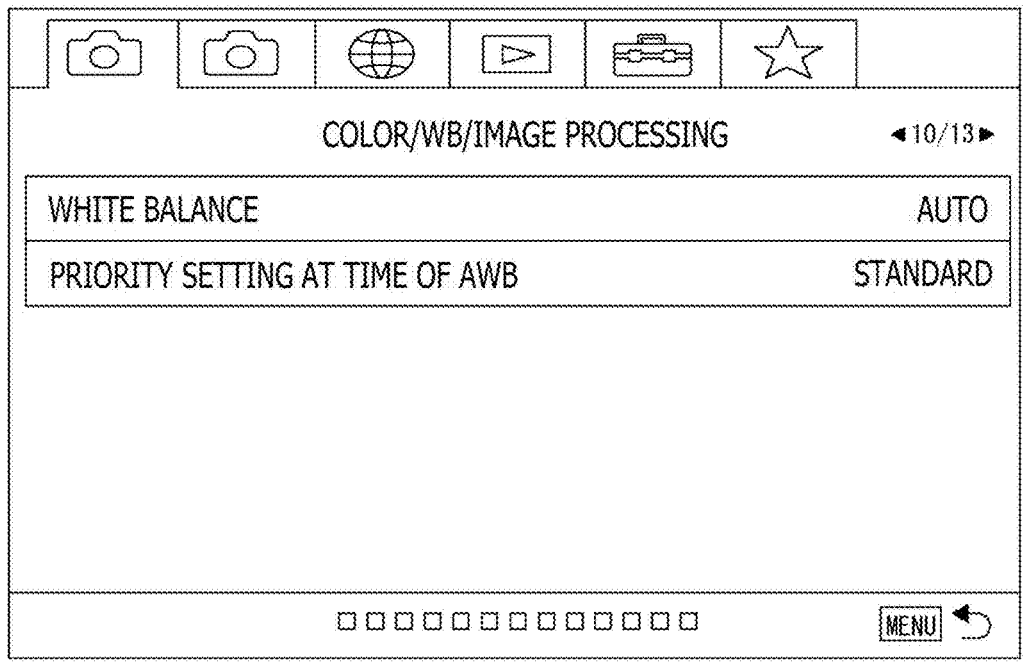
FIGS. 4A and 4B depict explanatory diagrams of examples of a mode setting screen of the imaging apparatus according to the embodiment.

As depicted in FIG. 4A, the user can select a white balance mode, a priority setting mode at the time of auto white balance (AWB), or the like.

As the white balance mode, the user can select "auto white balance (AWB)," "sunlight," "shade," "cloudy weather," "fluorescent light (warm white/white/neutral white/daylight)," "flash," "underwater," or the like.

As the priority setting at the time of auto white balance, the user can select any of "standard," "atmosphere priority," and "white priority."

The "white priority" is a mode for performing white balance adjustment to realize correct white. In other words, the "white priority" is the mode for designating the white balance adjustment in such a manner as to cancel the tint of the light source.

The "atmosphere priority" is a mode for designating the white balance adjustment for obtaining an image that can represent an atmosphere on a spot by leaving a color tone of the light source uncancelled. The "atmosphere priority" is suitable when warm atmosphere is to be rendered. This atmosphere priority mode is, for example, a mode for leaving a light bulb color.

The "standard" is a mode for designating intermediate white balance adjustment between that for the white priority and that for the atmosphere priority.

Figure 4B:
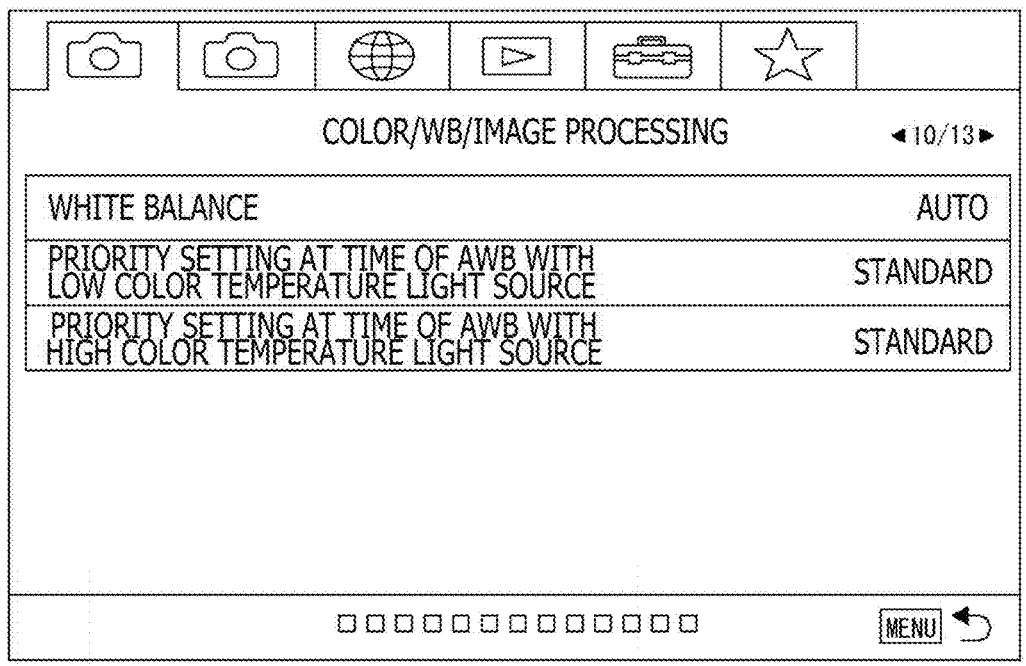

It is noted that FIG. 4B depicts an example in which the user can select any of "priority setting at the time of auto white balance (AWB) with low color temperature light source" and "priority setting at the time of auto white balance (AWB) with high color temperature light source" as the priority setting at the time of auto white balance. An example of using such mode selection will be described later.

Furthermore, FIGS. 4A and 4B are examples of a user interface for mode setting, and other examples may be assumed. For example, instead of allowing the user to select any of "standard, "atmosphere priority," and "white priority" upon selecting auto white balance, the user can be allowed to directly select any of the modes. Examples of such a user interface include a user interface that enables the user to directly select any of "auto white balance (standard)," "auto white balance (atmosphere priority)," "auto white balance (white priority)," "sunlight," "shade," "cloudy weather," "fluorescent light (warm white/white/neutral white/daylight)," "flash", and "underwater."

Here, in a case, for example, in which the user selects the atmosphere priority mode upon selecting the auto white balance mode on the user interface depicted in FIG. 4A, white balance adjustment is performed in such a manner that the tint of the light source remains (tint of the light source at the time of image capturing is not cancelled). In such a case, in a case of performing image adjustment to be adaptable to the tint remaining amount in image processing other than the white balance, a higher quality image can often be obtained.

For example, in a case of developing a RAW image captured with a low color temperature light source (2500K or the like) and a warm orange color of the light source is left uncancelled on purpose by the white balance, a skin color of a person not extremely orange will give a better impression. Therefore, performing color processing based on the tint remaining amount such as that for lowering saturation of the skin color or other kinds of processing makes it possible to obtain an image with a better impression.

In the present embodiment, the controlling value reflective of the tint remaining amount is generated and the image processing parameter is modulated using the controlling value on the basis of such a concept, for example.

It is noted that the tint remaining amount in such case may be a difference (ratio) between the white balance gain for cancelling the tint of the light source that are is used in development and the white balance gain for leaving uncancelled the tint of the light source that is used in development.

Figure 5:
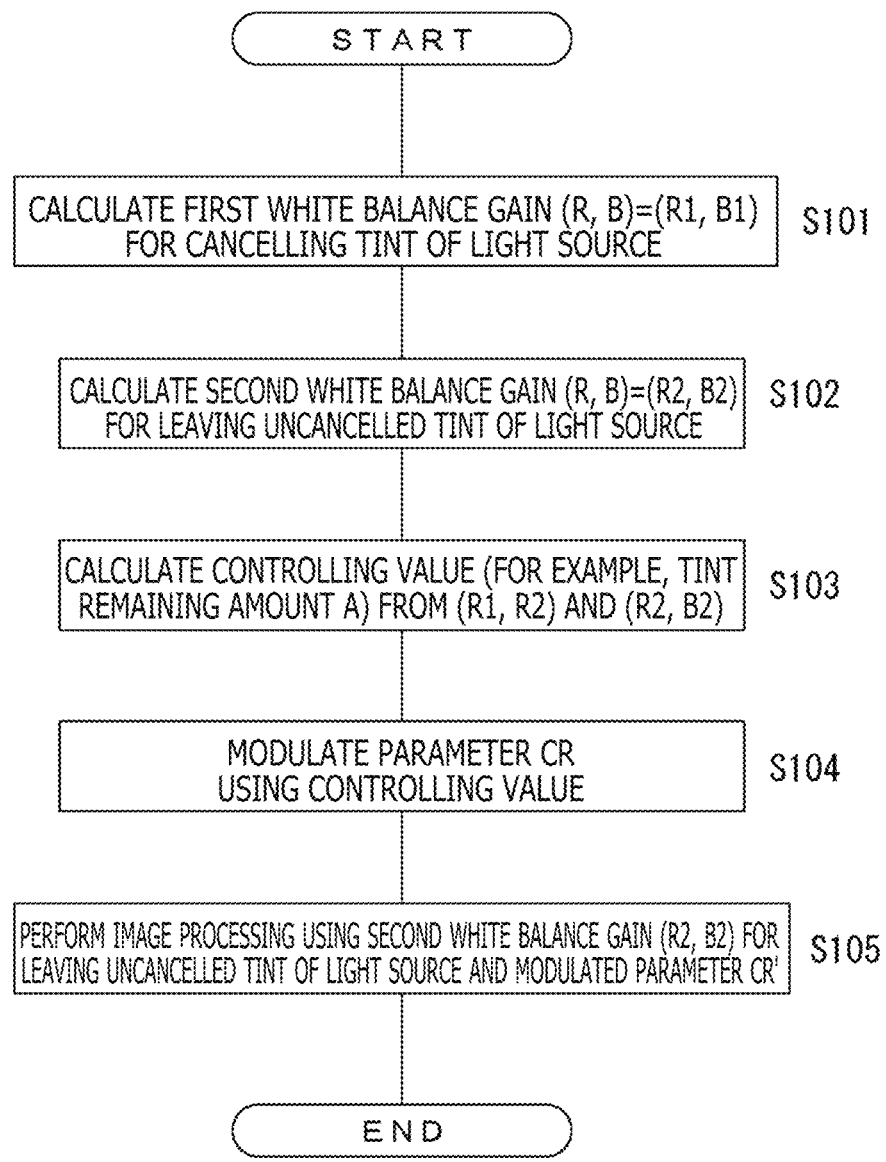
FIG. 5 is a flowchart of parameter modulation processing and development processing according to the embodiment.

FIG. 5 depicts a specific example of processing for obtaining the controlling value reflective of the tint remaining amount, modulating the parameter using the controlling value, and performing image processing using the modulated parameter. This is an example of processing executed by the image processing apparatus 20 having the functions depicted in FIG. 2.

In Step S101, the image processing apparatus 20 performs processing for calculating the first white balance gain (R1, B1). "R1" is a gain for an R signal, while "B1" is a gain for a B signal. These are values of the gains applied to the R signal and the B signal to cancel the tint of the captured image data and are the white balance gain for use in the case of, for example, the white priority mode described above.

In Step S102, the image processing apparatus 20 performs processing for calculating the second white balance gain (R2, B2). "R2" is a gain for the R signal, while "B2" is a gain for the B signal. These are values of gains applied to the R signal and the B signal to leave uncancelled the tint of the captured image data and are the white balance gain for use in the case of, for example, the atmosphere priority mode described above.

It is noted that in the embodiment, while one example is described with each white balance gain being assumed as the gain for the R signal and the gain for the B signal and the white balance adjustment being performed using such a white balance gain, needless to say, other white balance adjustment schemes such as a scheme of assuming gains for a Cb signal and a Cr signal as a white balance gain may be used.

An example of a calculation method of obtaining the second white balance gain to leave uncancelled the tint of the light source from the first white balance gain for cancelling the tint of the light source will be described.

Figure 6:
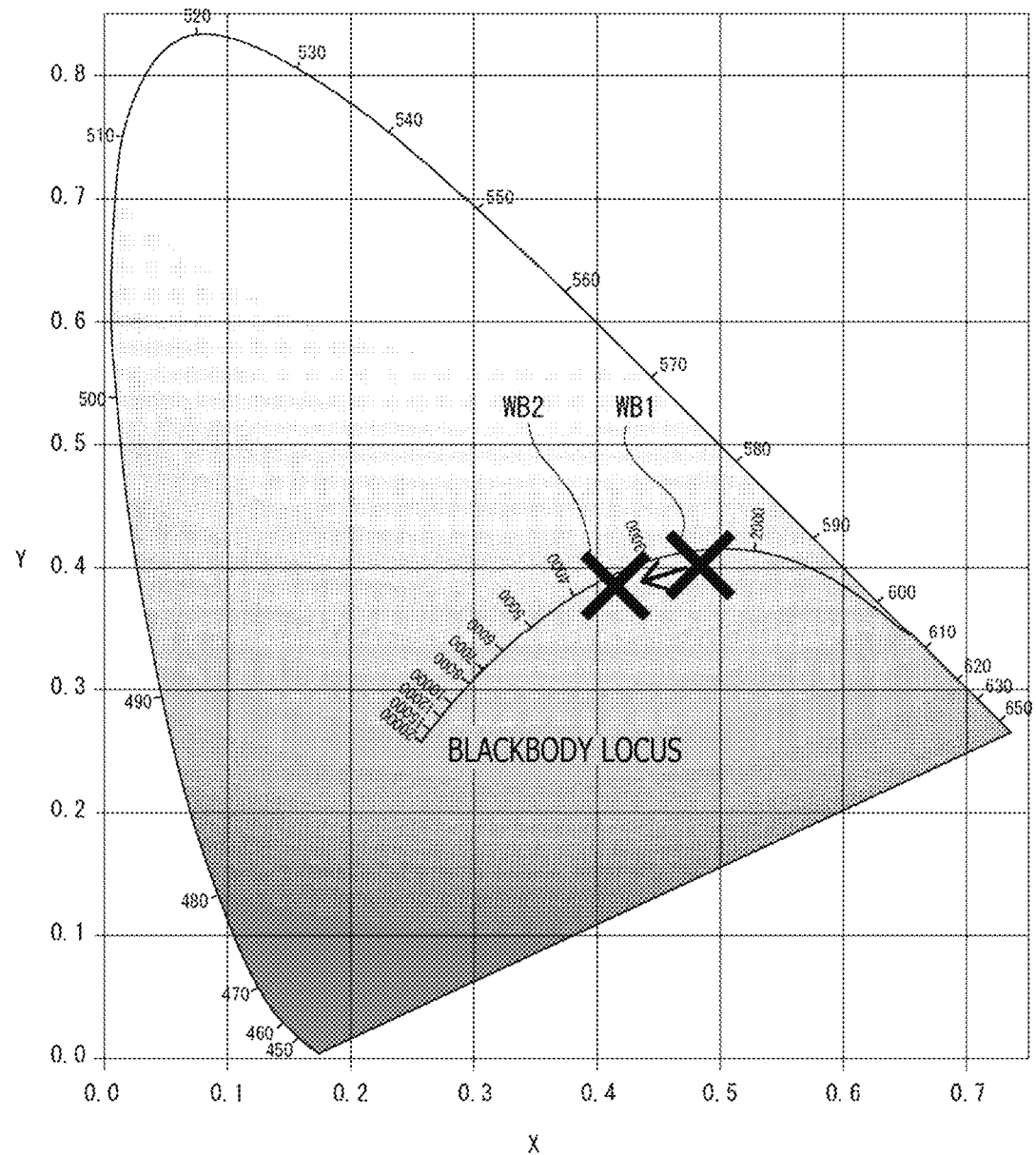
FIG. 6 is an explanatory diagram of calculation of a second white balance gain according to the embodiment.

It is assumed that the image processing apparatus 20 calculates the first white balance as a point (approximately 2500K) with an x mark (WB1) of FIG. 6 from the captured image data to be processed. It is noted that FIG. 6 depicts the x mark (WB1) and an x mark (WB2) in a well-known CIE1931 xy chromaticity diagram.

The second white balance can be determined as a point shifted by a fixed amount to a high color temperature side along a blackbody locus of FIG. 6. The second white balance will be the second white balance for leaving uncancelled the orange tint of the light source by as much as a shift. The second white balance is denoted by the x mark (WB2).

While FIG. 6 is an example of the calculation method, the second white balance can leave uncancelled a blue tint of the light source by shifting the first white balance to a low color temperature side by a fixed amount in a case in which the first white balance is calculated as the point closer to the high color temperature side.

Furthermore, even in a case in which the first white balance is not on the blackbody locus, the second white balance can be determined by shifting the first white balance to the high color temperature side (or low color temperature side) with a deviation from the blackbody locus in a perpendicular direction kept.

A specific calculation example will be described on the following assumption.

The first white balance gain (R, B)=(R1, B1) for canceling the tint of the light source The second white balance gain (R, B)=(R2, B2) for leaving uncancelled the tint of the light source A function=f1 (r, b) for converting the white balance gain (R, B) into a color temperature K and a difference D in the perpendicular direction to the color temperature A function=f2 (k, d) for converting the color temperature K and the difference D in the perpendicular direction to the color temperature into the white balance gain (R, B)

A function=f3 (K) for obtaining a shift amount S from the color temperature K

Under this assumption, the second white balance gain (R2, B2) can be obtained from the first white balance gain (R1, B1) by the following calculation.

$$(K1, D1) = f1(R1, B1)$$

$$S = f3(K1)$$

$$K2 = K1 + S$$

$$(R2, B2) = f2(K2, D1)$$

For example, upon obtaining the first white balance gain and the second white balance gain as described above, the image processing apparatus 20 calculates a tint remaining amount A as the controlling value for parameter modulation in Step S103 of FIG. 5. For example, the image processing apparatus 20 obtains the tint remaining amount A as a difference between the first white balance gain and the second white balance gain.

The tint remaining amount A is obtained, for example, by the following (Expression 1).

$$LgR1 = \text{Log}_2 R1$$

$$LgB1 = \text{Log}_2 B1$$

$$LgR2 = \text{Log}_2 R2$$

$$LgB2 = \text{Log}_2 B2$$

$$A = \sqrt{(LgR1 + LgR2)^2 + (LgB1 + LgB2)^2} \qquad \text{[Math. 1]}$$

It is noted that the controlling value is not limited to the tint remaining amount A and is sometimes set to a tint remaining coefficient A' to be described later or the like. For example, it is assumed that the controlling value is a value reflective of the tint remaining amount such as the tint remaining amount A or the tint remaining coefficient A'.

In Step S104, the image processing apparatus 20 modulates a parameter used in image processing, using the controlling value (tint remaining amount A, for example). As the image processing parameter, any of various parameters including a color reproduction parameter such as an area compression offset value to be described later, a compression ratio, and a linear matrix coefficient can be applied.

The color reproduction parameter is assumed, for example, as follows.

Color reproduction parameter before modulation=CR

Color reproduction parameter after modulation=CR'

Under this assumption, the parameter is modulated as follows.

$$CR' = CR \times 2^A$$

In Step S105, the image processing apparatus 20 performs image processing, for example, development of the RAW image data, using the second white balance gain (R2, B2) and the modulated parameter CR'. For example, the image processing apparatus 20 performs white balance adjustment using the second white balance gain, and performs linear matrix processing, aperture control processing, gamma correction processing, or the like using the color reproduction parameter CR'.

It is noted that the parameter CR to be modulated is not limited to a parameter for use in a stage of development processing on the RAW image, and a parameter for use in luminance processing, a parameter for use in chrominance signal processing, a parameter for use in RGB data processing, or the like is assumed to be the parameter CR to be modulated.

By performing the processing of FIG. 5 described above, it is, for example, possible to realize image processing in which the parameter is modulated to be reflective of the ting remaining amount in the white balance processing and to realize generation of a higher quality image.

The image processing apparatus 20 performing such processing is to include software for executing the functions of FIG. 2 (particularly, the image signal processing section 21, the controlling value calculation section 23, and the parameter modulation process 24).

The software can exercise control over estimation of the first white balance gain that cancels the tint of the light source.

In addition, the software can perform white balance adjustment processing using the second white balance gain that leaves the tint of the light source uncancelled.

Further, the software can calculate the controlling value (tint remaining amount A, for example) using the first white balance gain and the second white balance gain.

Moreover, the software can modulate the parameter CR for use in predetermined image processing, using the controlling value (tint remaining amount A, for example), and generate the modulated parameter CR'.

Furthermore, the software can perform predetermined image processing using the modulated parameter CR'.

Another example of the processing performed by the image processing apparatus 20 will be described.

Figure 7:
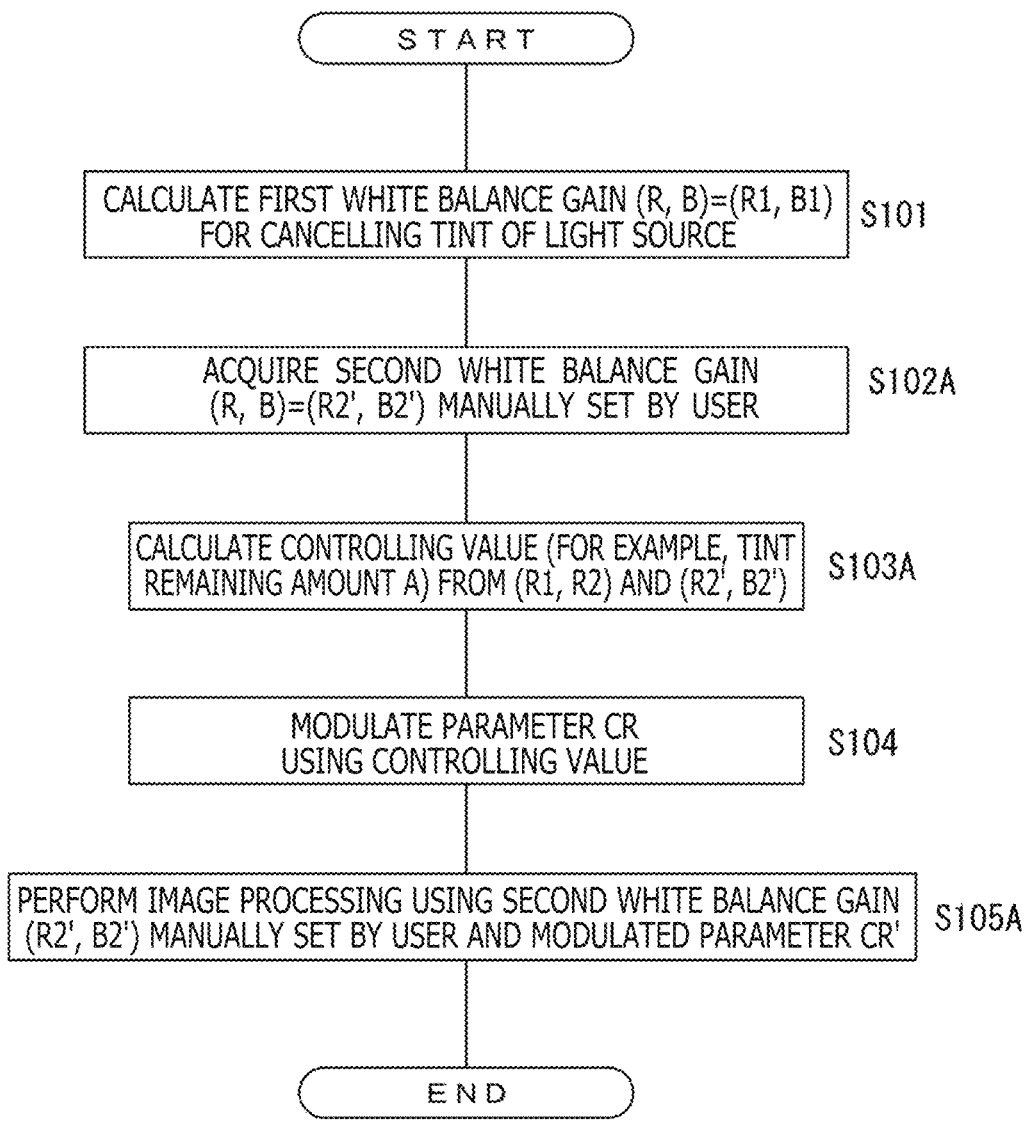
FIG. 7 is another flowchart of the parameter modulation processing and the development processing according to the embodiment.

FIG. 7 is an example of setting the second white balance gain (R1, B1) using user input information.

In Step S101, the image processing apparatus 20 calculates the first white balance gain for the image data to be processed.

In Step S102, the image processing apparatus 20 sets the second white balance gain. In this case, it is assumed that the second white balance gain (R2', B2') contains values designated by the user using the operation section 18.

In Step S103A, the image processing apparatus 20 calculates the controlling value (tint remaining amount A, for example) using the first white balance gain (R1, B1) and the user-designated second white balance gain (R2', B2').

Then, in Step S104, the image processing apparatus 20 modulates the parameter CR into the parameter CR' using the controlling value (tint remaining amount A, for example). In Step S105A, the image processing apparatus 20 performs image processing such as development of the RAW image data, using the user-designated second white balance gain (R2', B2') and the modulated parameter CR'.

For example, the image processing apparatus 20 performs white balance adjustment using the second white balance gain (R2', B2'), and performs the linear matrix processing, the aperture control processing, the gamma correction processing, or the like using the color reproduction parameter CR'.

In a case of actual white balance, the user sometimes designates a white balance gain for atmosphere setting. This corresponds to, for example, a case of user's setting a white balance gain to leave uncancelled the tint on purpose by user's manual operation.

In that case, similarly to the above, modulating the image processing parameter according to user's desired tint remaining makes it possible to perform image processing adaptive to the user's desired white balance.

Figure 8B:
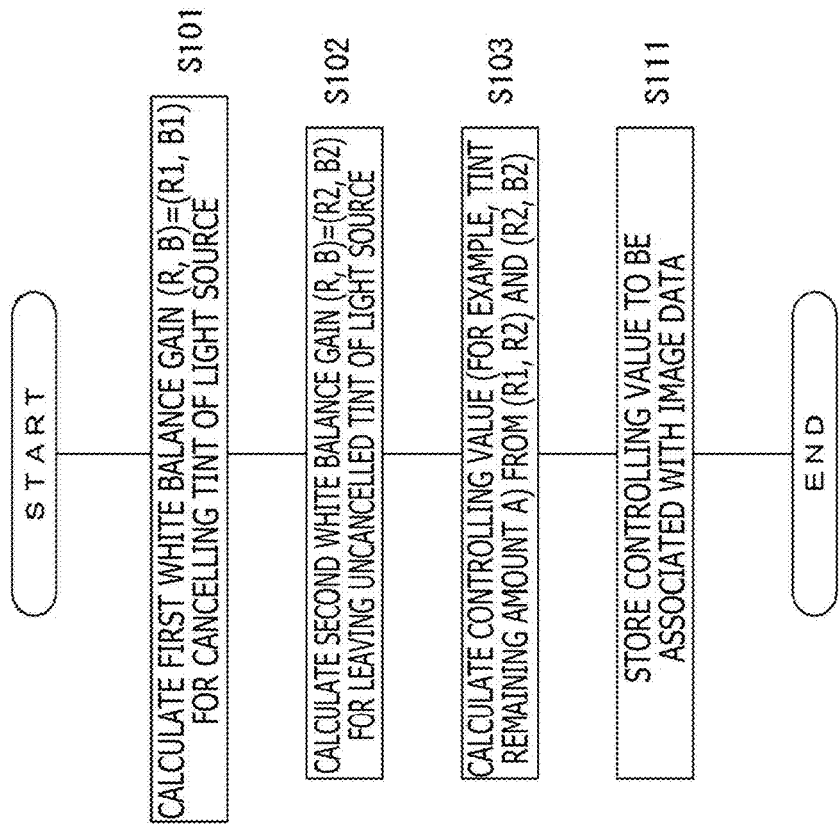
FIGS. 8A and 8B depict flowcharts of the parameter modulation processing and storage processing according to the embodiment.
Figure 8A:
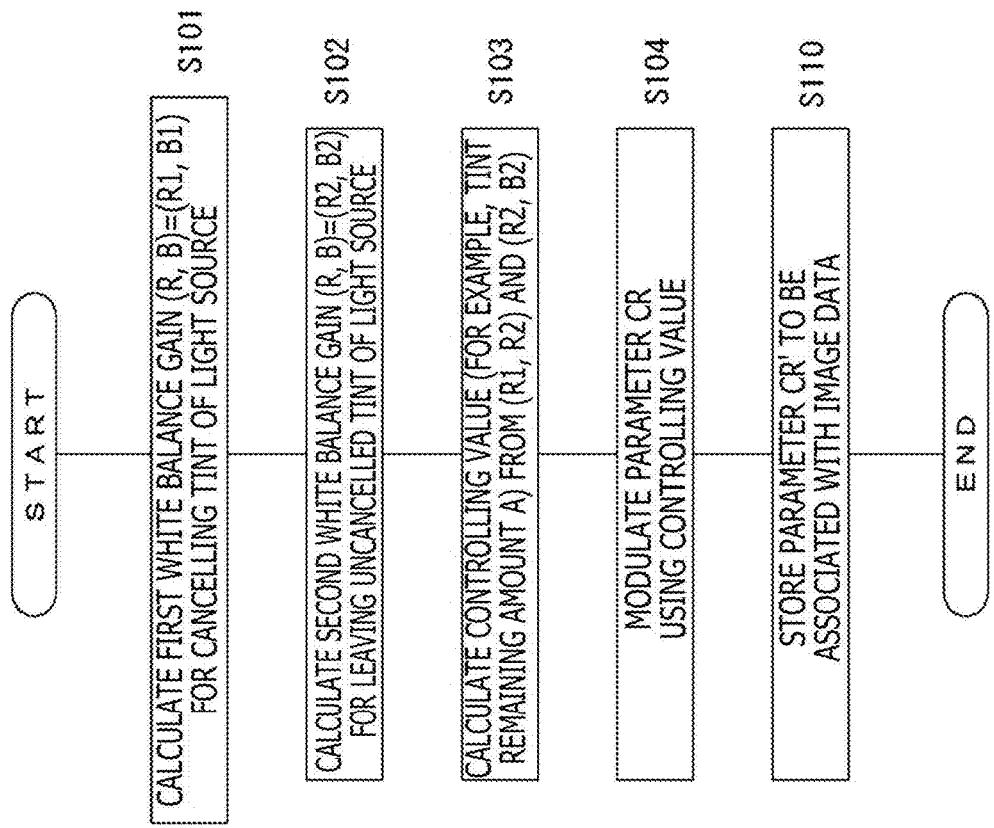

FIGS. 8A and 8B are examples of storing the modulated parameter or the controlling value in the storage medium 15a.

Steps S101 to S104 in FIG. 8A are similar to those in FIG. 5.

Upon generating the modulated parameter CR' by the processing up to Step S104, the image processing apparatus 20 performs processing for storing the modulated parameter CR' in such a manner as to be associated with the image data, in Step S110. In other words, the image processing apparatus 20 outputs the modulated parameter CR' to the storage section 15 as information to be stored. In a case, for example, in which the image data is converted into an image data file and the storage section 15 stores the image data file in the storage medium 15a, the image processing apparatus 20 stores the parameter CR' together with the image data file in the storage medium 15a by containing the parameter CR' in the image data file, as additional information corresponding to the image data.

By doing so, in a case of reading out the image data file from the storage medium 15a, the imaging apparatus 1 or other apparatuses can perform image processing using the modulated parameter CR'. Particularly in a case in which the image data file contains the RAW image data, the modulated parameter CR' can also be used in the development processing.

FIG. 8B will next be described. Steps S101 to S103 are similar to those in FIG. 5.

For example, upon calculating the controlling value such as the tint remaining amount A by the processing up to Step S103, the image processing apparatus 20 performs processing for storing the controlling value in such a manner as to be associated with the image data, in Step S111. In other words, the image processing apparatus 20 outputs the controlling value to the storage section 15 as information to be stored. In a case, for example, in which the image data is converted into an image data file and the storage section 15 stores the image data file in the storage medium 15a, the image processing apparatus 20 causes the controlling value to be contained in the image data file, as additional information regarding the image data.

By doing so, in a case of reading out the image data file containing the RAW image data from the storage medium 15a, the imaging apparatus 1 or other apparatuses can modulate the parameter CR for use in the image processing, using the controlling value, to generate the parameter CR', and perform image processing using the modulated parameter CR'.

Figure 9B:
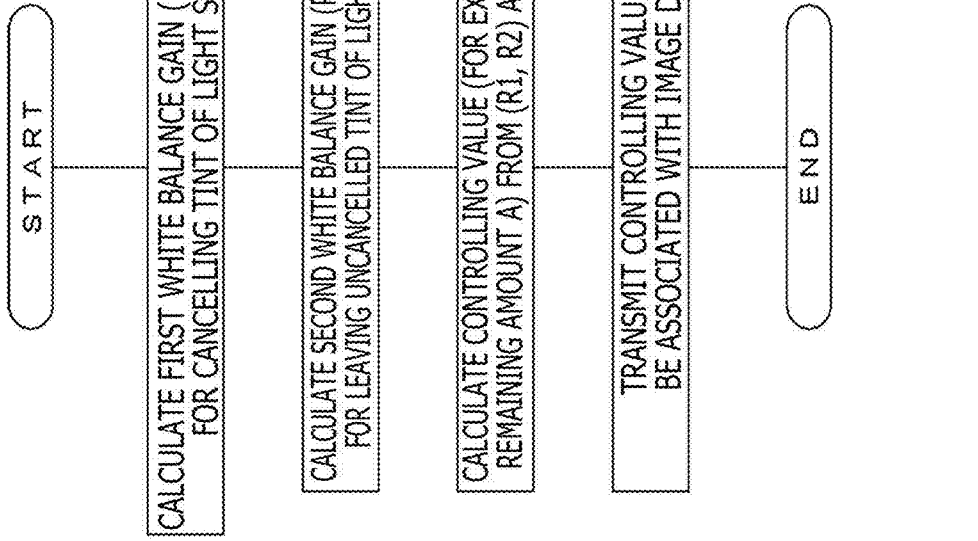
FIGS. 9A and 9B depict flowcharts of the parameter modulation processing and transmission processing according to the embodiment.
Figure 9A:
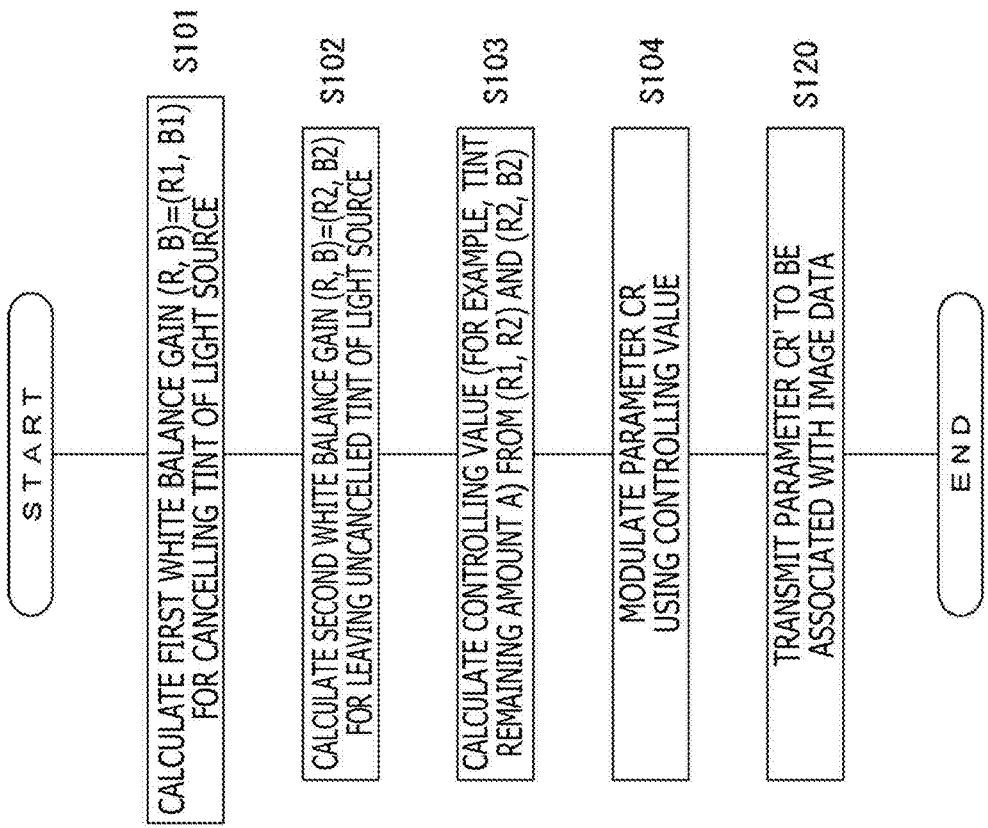

FIGS. 9A and 9B are examples of transmitting the modulated parameter or the controlling value to the external apparatus.

Steps S101 to S104 in FIG. 9A are similar to those in FIG. 5.

Upon generating the modulated parameter CR' by the processing up to Step S104, the image processing apparatus 20 performs processing for transmitting the modulated parameter CR', in Step S120. In other words, the image processing apparatus 20 outputs the modulated parameter CR' to the communication section 16 as information to be transmitted. For example, the image processing apparatus 20 transmits the modulated parameter CR' to the external apparatus from the communication section 16 in such a manner as to be associated with the image data. In a case of, for example, converting the RAW image data into a data file and transmitting the data file, the image processing apparatus 20 causes the parameter CR' to be contained in the data file, as additional information corresponding to the RAW image data.

By doing so, in a case in which an apparatus other than the imaging apparatus 1 performs the development processing, image editing processing, or the like, the apparatus can use the modulated parameter CR'.

FIG. 9B will next be described. Steps S101 to S103 are similar to those in FIG. 5.

For example, upon calculating the controlling value such as the tint remaining amount A by the processing up to Step S103, the image processing apparatus 20 performs processing for transmitting the controlling value, in Step S121. In other words, the image processing apparatus 20 outputs the controlling value to the communication section 16 as information to be transmitted. For example, the image processing apparatus 20 transmits the controlling value to the external apparatus from the communication section 16 in such a manner as to be associated with the image data. In a case of, for example, converting the RAW image data into a data file and transmitting the data file, the image processing apparatus 20 causes the controlling value to be contained in the RAW image data, as additional information regarding the RAW image data.

By doing so, the apparatus other than the imaging apparatus 1 can modulate the parameter CR for use in the image processing, using the controlling value, to generate the parameter CR', and perform the development processing, the image editing processing, or the like, using the parameter CR'.

<3. Examples of Applicable Processing>

Examples of the image processing in which the modulated parameter CR' can be used as described above will hereinafter be described.

[Linear Matrix Processing]

An example of processing performed by the linear matrix processing section 55 of FIGS. 3A and 3B will first be described.

In the linear matrix processing, color reproduction processing is performed by matrix calculation. An example of a calculation method of modulating color reproduction by a combination of the matrix calculation with the tint remaining amount A will be described here.

A purpose of the following modulation is to make it possible to further highlight the atmosphere of the spot by increasing saturation of warm colors in the color reproduction in a case of setting the white balance gain to leave uncancelled a tint of a low color temperature light source.

Another purpose of the following modulation is to further highlight the atmosphere of the spot by increasing saturation of cold colors in the color reproduction in a case of setting the white balance gain to leave uncancelled a tint of a high color temperature light source.

First, matrices 1, 2, and 3 each serving as the color reproduction parameter CR in the linear matrix processing will be described. It is noted that Rin, Gin, and Bin denote R data, G data, and B data input to the image processing apparatus 20 in the linear matrix processing, and Rout, Gout, and Bout denote R data, G data, and B data output from the image processing apparatus 20 in the linear matrix processing.

[Math. 2]
$$\begin{bmatrix} Rout \\ Gout \\ Bout \end{bmatrix} = \begin{bmatrix} 1.1 & -0.2 & 0.1 \\ -0.1 & 1.2 & -0.1 \\ 0.2 & -0.2 & 1.0 \end{bmatrix} \begin{bmatrix} Rin \\ Gin \\ Bin \end{bmatrix} \quad \text{Matrix 1}$$

[Math. 3]
$$\begin{bmatrix} Rout \\ Gout \\ Bout \end{bmatrix} = \begin{bmatrix} 1.0 & -0.2 & 0.2 \\ -0.2 & 1.4 & -0.2 \\ 0.1 & -0.2 & 1.1 \end{bmatrix} \begin{bmatrix} Rin \\ Gin \\ Bin \end{bmatrix} \quad \text{Matrix 2}$$

[Math. 4]
$$\begin{bmatrix} Rout \\ Gout \\ Bout \end{bmatrix} = \begin{bmatrix} 1.4 & -0.3 & -0.1 \\ 0.2 & 1.0 & -0.2 \\ 0.1 & -0.3 & 1.2 \end{bmatrix} \begin{bmatrix} Rin \\ Gin \\ Bin \end{bmatrix} \quad \text{Matrix 3}$$

The matrix 1 is a matrix for realizing standard color reproduction.

The matrix 2 is a matrix for increasing saturation of hues of warm colors, compared with the matrix 1.

The matrix 3 is a matrix for increasing the saturation of the hues of cold colors, compared with the matrix 1.

Such a matrix 1, 2, or 3 (color reproduction parameter CR) is modulated in such a manner as to be reflective of the tint remaining amount A.

This example is assumed as an example of using a tint remaining amount A' obtained by converting the tint remaining amount A into a ratio.

In a case in which the tint remaining amount A is to leave uncancelled the tint in a low color temperature direction, the tint remaining coefficient A' takes on a value greater than 0 but equal to or smaller than 1. As the value is greater, the tint remaining coefficient A' indicates a coefficient that leaves uncancelled the tint of the lower color temperature light source.

Furthermore, in a case in which the tint remaining amount A is to leave uncancelled the tint in a high color temperature direction, the tint remaining coefficient A' takes on a value smaller than 0 but equal to or greater than −1. As the value is smaller, the tint remaining coefficient A' indicates a coefficient that leaves uncancelled the tint of the higher color temperature light source.

For example, with the tint remaining amount equal to or greater than 500K, the tint remaining coefficient A' is assumed to be 1.0.

With the tint remaining amount A being equal to or smaller than 100K, the tint remaining coefficient A' is assumed to be 0.

With the tint remaining amount A falling between 500K and 100K, the tint remaining coefficient A' is obtained by linear interpolation.

In a case of assuming that the tint remaining coefficient A' in a low color temperature direction takes on a positive value and the tint remaining coefficient A' in a high color temperature direction takes on a negative value as described above and considering a case of leaving the tint by approximately 300K in the low color temperature light source direction, the tint remaining coefficient A'=0.5 is established. The tint remaining coefficient A' is obtained by calculation of the linear interpolation as in (300−100)/(500−100)=0.5.

Furthermore, in a case of leaving the tint in the high color temperature direction by approximately 300K, tint remaining coefficient A'=−0.5 is established.

Using such a tint remaining coefficient A', the color reproduction parameter CR is modulated as follows.

In a case of tint remaining coefficient A'=0,
Color reproduction matrix=matrix 1.

In a case of tint remaining coefficient A'>0,
Color reproduction matrix=A'×matrix 2+(1−A')×matrix 1.

In a case of tint remaining coefficient A'<0,
Color reproduction matrix=A'×matrix 3+(1+A')×matrix 1.

In the above description, the color reproduction matrix is the color reproduction parameter CR' modulated to be reflective of the tint remaining amount A, that is, the controlling value.

By performing the linear matrix processing using the matrix obtained as such a color reproduction parameter CR', the color reproduction processing reflective of the tint remaining amount A is realized.

[Processing for Changing Color Reproduction Only for Specific Hue]

As the color processing on, for example, the chrominance signal(s) (R-Y, B-Y, or Cr and Cb), processing for changing color reproduction only for a specific hue is sometimes performed. Therefore, the color reproduction may be modulated by a combination of the processing for changing color reproduction only for a specific hue and the tint remaining amount.

It is noted that while an example of processing for changing the color reproduction only for a specific hue using a Lab color space is described below, processing in each example to be described can also be represented in a CrCb space or the other color space. Eventually, there may be various specific examples of parameters used in processing for changing the color reproduction only for a specific hue, as color processing on, for example, the chrominance signal(s) (R-Y, B-Y, or Cr and Cb) or the RGB signals.

First, processing for modulating the color reproduction by modulating saturation of only a color of interest will be described with reference to FIGS. 10A and 10B.

Figure 10A:
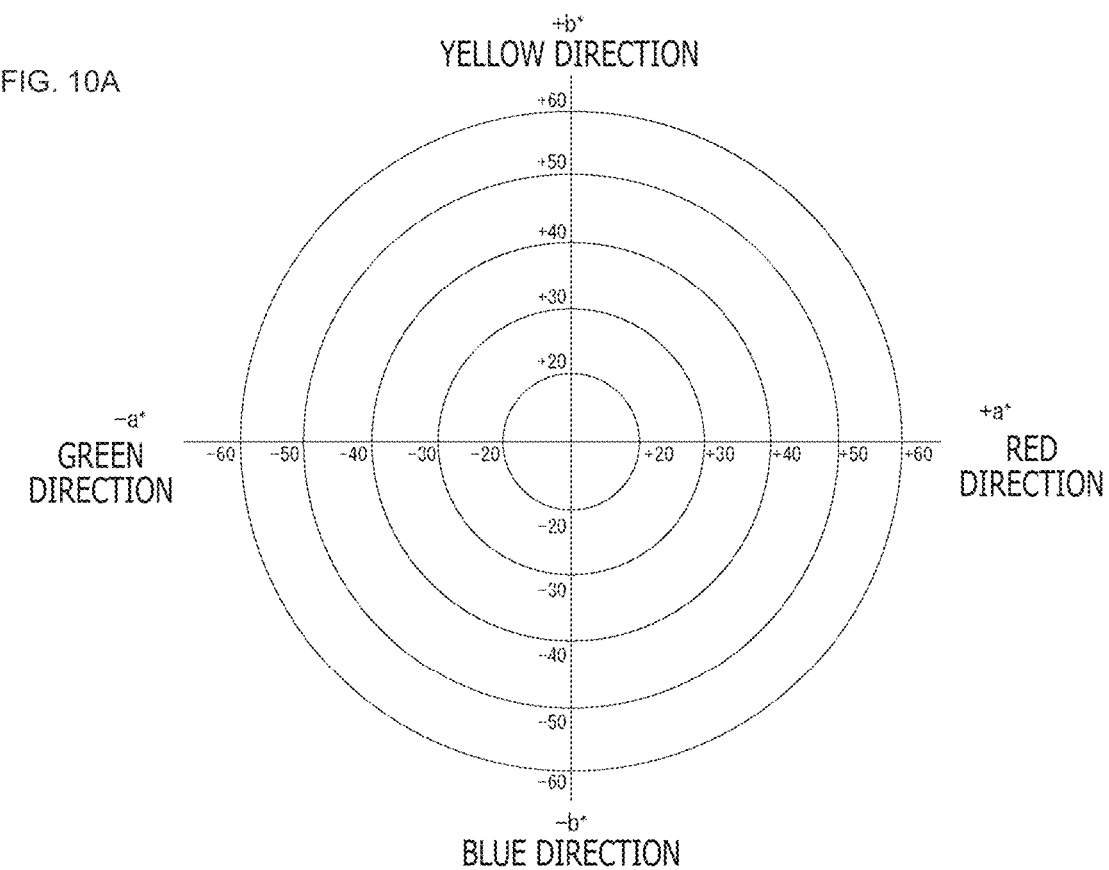
FIGS. 10A and 10B depict explanatory diagrams of an example of application of the embodiment to processing for changing color reproduction of a specific hue.
Figure 10B:
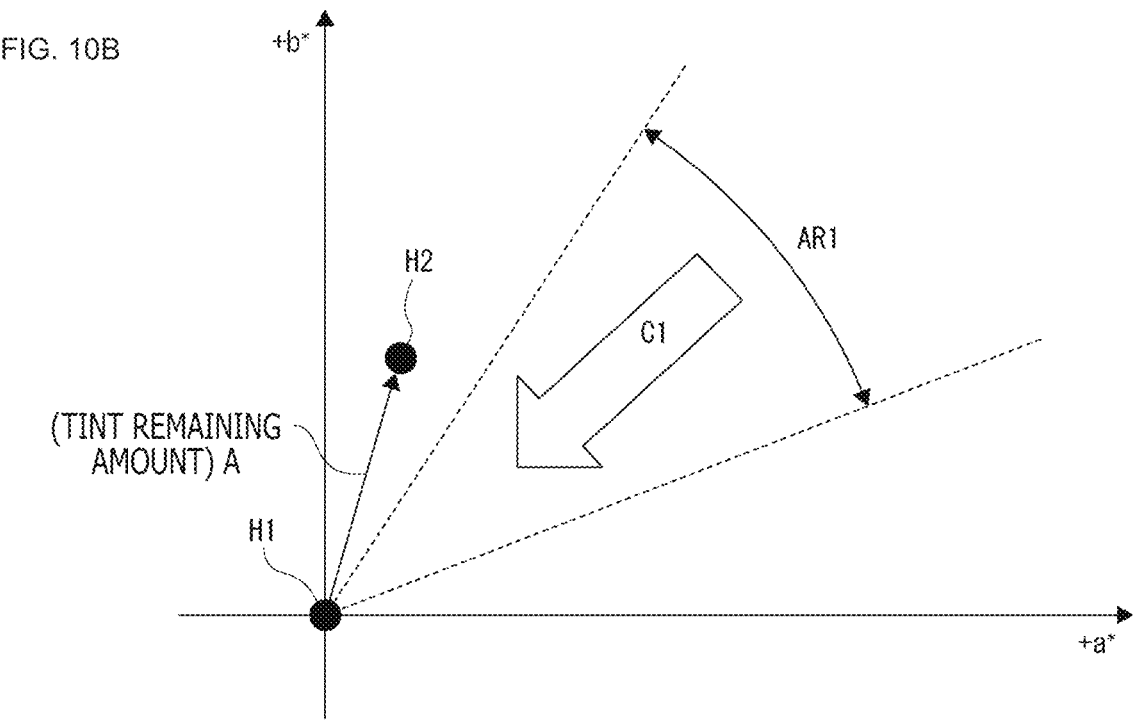

FIG. 10A depicts a Lab color space, and FIG. 10B depicts a first quadrant of FIG. 10A.

While FIG. 10B depicts a hue of an achromatic subject H1 developed with the white balance gain for cancelling the tint of the light source and a hue of an achromatic subject H2 developed with the white balance gain for leaving uncancelled the tint of the low color temperature light source, the difference between the hues corresponds to the tint remaining amount A.

An area AR1 as an angular range within the first quadrant is an area of a hue of a skin color. An arrow C1 indicates that saturation of the hue of the skin color is modulated. By changing a hue within the area AR1 to be closer to an achromatic color in a direction of the arrow C1, the saturation of the skin color is reduced.

Processing like this is performed according to the tint remaining amount A.

In other words, as the color correction processing on the pixel data concerning a skin color area, the parameter CR for performing shift (compression) in the arrow C1 direction for suppressing the saturation is modulated according to the tint remaining amount A. Using the modulated parameter CR', color information regarding the skin color is then shifted (saturation-compressed) in the arrow C1 direction.

In a case of performing white balance adjustment in such a manner as to leave uncancelled the tint of the low color temperature light source, a shift amount (or shift coefficient) in the arrow C1 direction to be applied to color information regarding the pixel data concerning the hue corresponding to the skin color within the area AR1 is modulated (compressed) according to the tint remaining amount A for the pixel data, thereby making it possible to appropriately suppress the saturation of the skin color according to the tint remaining amount A so that the skin color is not extremely dark.

For example, in a case of developing a RAW image captured with the low color temperature light source (2500K or the like) and leaving the warm orange color of the light source uncancelled as a light source color on purpose by white balance processing, the skin of a person is sometimes extremely orange. A better impression can be given if the skin color of a person is not extremely orange. Therefore, the saturation of the skin color is reduced according to the tint remaining amount A as described above. It is thereby possible to develop an image with a better impression.

Figure 11A:
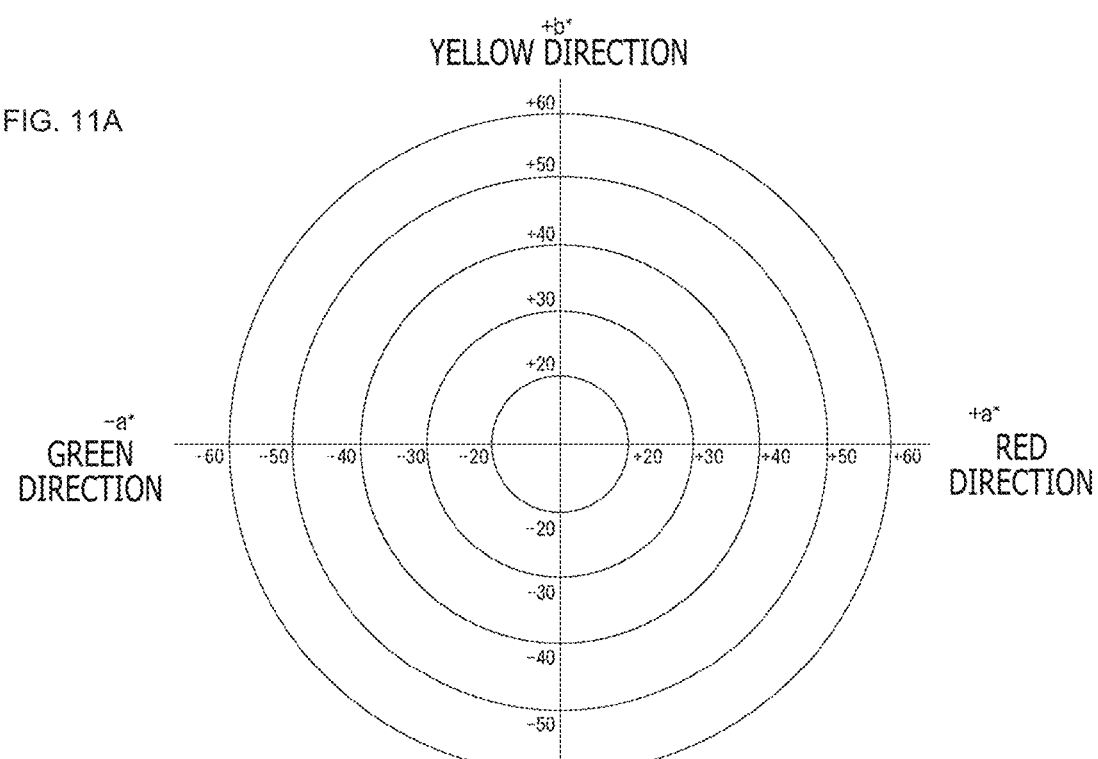
FIGS. 11A and 11B depict explanatory diagrams of an example of application of the embodiment to the processing for changing color reproduction of a specific hue.

Next, processing for modulating color reproduction by performing modulation to rotate the hue of only a color of interest will be described with reference to FIGS. 11A and 11B. FIG. 11A depicts a Lab space similarly to FIG. 10A, and FIG. 11B depicts first and fourth quadrants of FIG. 11A.

Figure 11B:
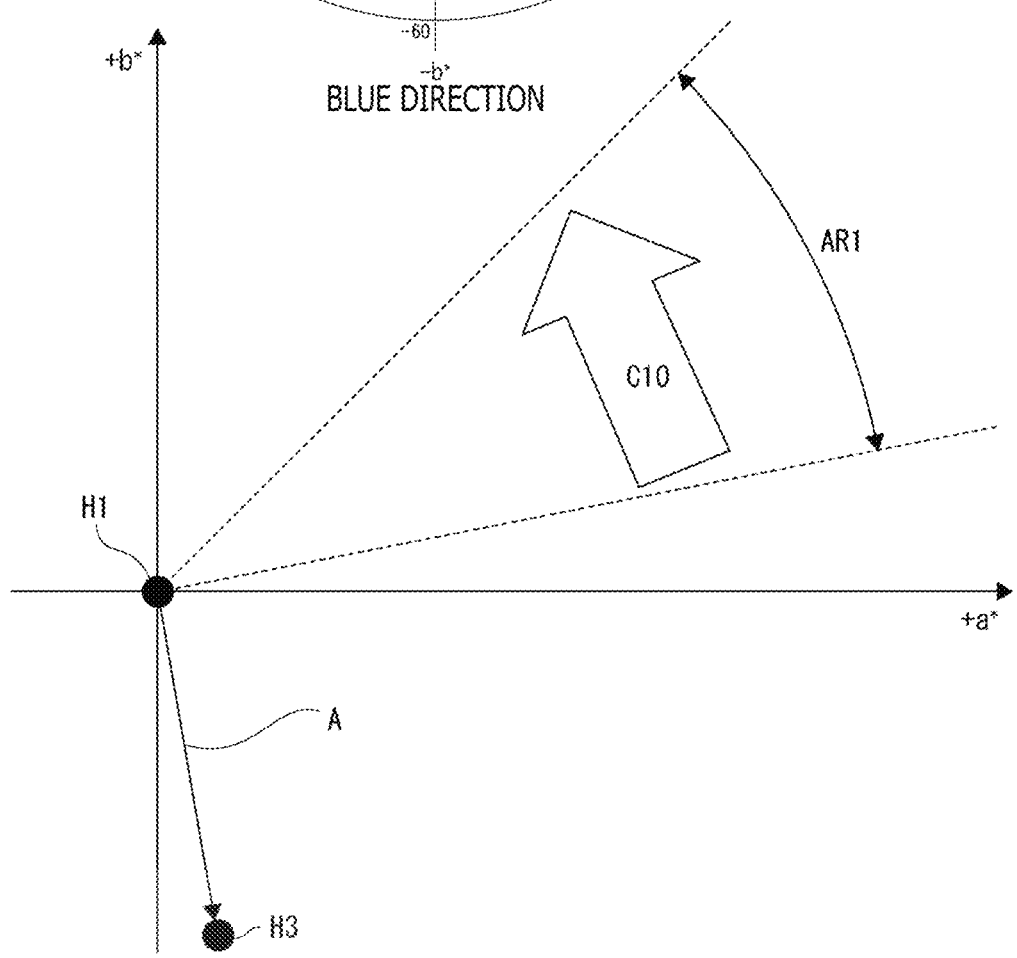

While FIG. 11B depicts the hue of the achromatic subject H1 developed with the white balance gain for cancelling the tint of the light source and a hue of an achromatic subject H3 developed with the white balance gain for leaving uncancelled the tint of the high color temperature light source, the difference between the hues corresponds to the tint remaining amount A. The area AR1 is the area of the skin color, similarly to FIGS. 10A and 10B. An arrow C10 indicates that the hue of the skin color is shifted in a yellow direction.

Processing like this is performed according to the tint remaining amount A.

In other words, as the color correction processing on the pixel data concerning the skin color area, the parameter CR for performing shift (hue change) in an arrow C10 direction is modulated according to the tint remaining amount A. Using the modulated parameter CR', color information regarding the skin color is then shifted (hue-changed) in the arrow C10 direction.

In a case of performing the white balance adjustment in such a manner as to leave uncancelled the tint of the high color temperature light source, a shift amount (or shift coefficient) in the arrow C10 direction to be applied to color information regarding the pixel data concerning the hue corresponding to the skin color within the area AR1 is modulated (compressed) according to the tint remaining amount A for the pixel data, thereby making it possible to appropriately change the skin color in the yellow direction according to the tint remaining amount A.

For example, in a case of developing a RAW image captured with the high color temperature light source (8000K or the like) and leaving a blue color, which gives a cool impression, of the light source uncancelled as a light source color on purpose by white balance processing, the skin of a person is sometimes extremely pale. A better impression can be given if the skin color of a person is not extremely blue. Therefore, the hue of the skin color is rotated in the yellow direction as described above. It is thereby possible to develop an image with a better impression.

Figure 12A:
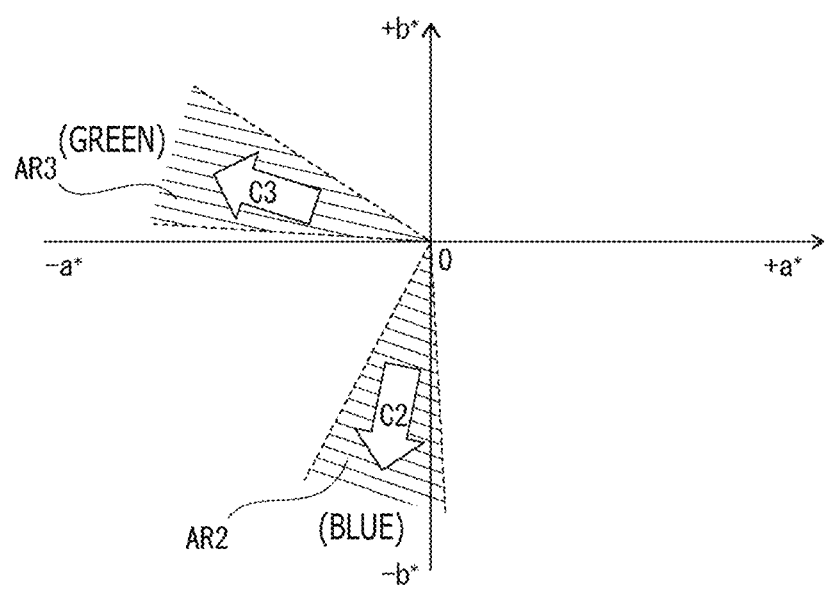
FIGS. 12A, 12B, and 12C depict explanatory diagrams of an example of application of the embodiment to the processing for changing color reproduction of a specific hue.
Figure 12B:
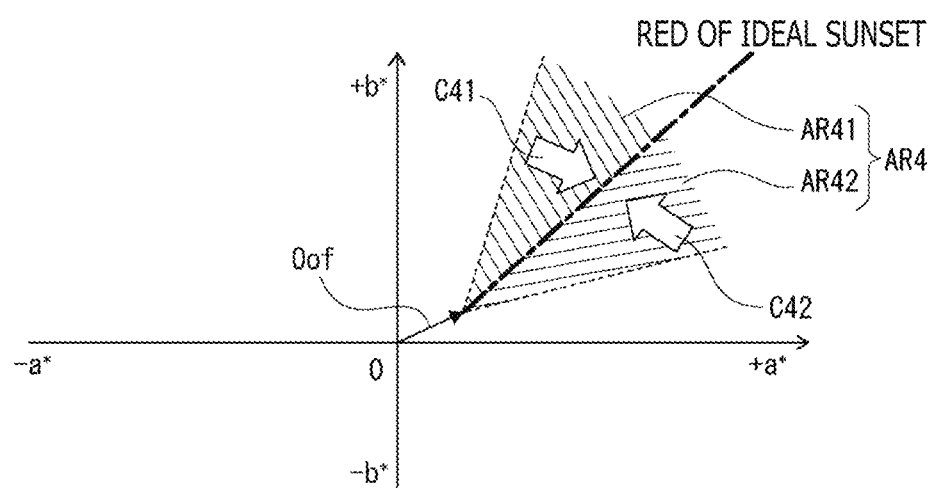
Figure 12C:
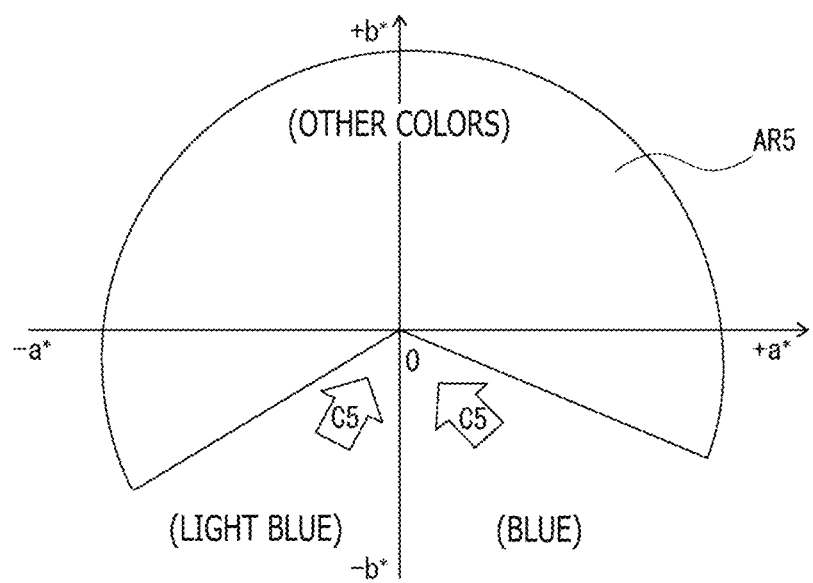

FIGS. 12A, 12B, and 12C further exemplarily depicts another example of the processing for changing the color reproduction for a specific hue. FIGS. 12A, 12B, and 12C each depict the Lab space depicted in FIG. 10A.

An area AR2 as an angular range from a third quadrant to the fourth quadrant in FIG. 12A is a blue area, and an area AR3 as an angular range within the third quadrant is a green area.

Shifting color information regarding pixel data concerning hues within the area A2 in an arrow C2 makes it possible to increase saturation. Therefore, for example, the parameter CR as a shift amount or a shift coefficient in an arrow C2 direction may be modulated according to the tint remaining amount A, and shift processing (blue saturation increase) may be performed using the modulated parameter CR'.

Likewise, shifting color information regarding pixel data concerning a hue within the area AR3 makes it possible to increase saturation. Therefore, for example, the parameter CR as a shift amount or a shift coefficient in an arrow C3 direction may be modulated according to the tint remaining amount A, and shift processing (green saturation increase) may be performed using the modulated parameter CR'.

Such processing makes it possible to increase the saturation of a specific color to be reflective of the tint remaining amount A or the like in the white balance adjustment.

In a case of, for example, leaving uncancelled the tint in the high color temperature direction by the white balance adjustment, colors of a blue sky and plants are darker and a landscape photograph can be made more impressive by increasing the saturation of blue and that of green as depicted in FIG. 12A.

It is noted that a parameter for determining the angular ranges of the areas AR2 and AR3 may be modulated using the controlling value. This can realize setting the range of each color the saturation of which is increased according to the tint remaining amount in the white balance adjustment.

Next, an area AR4 as an angular range within the first quadrant in FIG. 12B is an area from red to yellow. It is assumed that a hue on a chain line is red of an ideal sunset.

It is assumed that an area AR41 is an area closer to yellow than the red of the ideal sunset, and an area AR42 is an area much closer to red than the red of the ideal sunset.

It is noted that while the area AR4 is a range of a hue to be modulated, FIG. 12B depicts an example in which the area AR4 as this modulation range is shifted from an origin by an amount indicated by an offset Oof. Needless to say, the area AR4 is sometimes defined as a fan-shaped area from the origin without giving an offset.

Furthermore, FIG. 12B depicts processing on pixel data concerning the hue within the area AR4 from red to yellow so that the hue can be made closer to the red of the ideal sunset. As for the pixel data having the hue within the area AR41, a parameter CR1 for performing shift (hue change) in an arrow C41 direction for hue correction is modulated according to the tint remaining amount A as the color correction processing. Using a coefficient as the modulated parameter CR1', color information within the area AR41 is then shifted (hue-changed) in the arrow C41 direction.

Likewise, a parameter CR2 for performing shift (hue change) in an arrow C42 direction for hue correction is modulated according to the tint remaining amount A. Using a coefficient as the modulated parameter CR2', color information within the area AR42 is then shifted (hue-changed) in the arrow C42 direction.

It is thereby possible to perform image processing such that the hue of the pixels within the area from red to yellow is made closer to red and skin colors of the ideal sunset, and further, a shift amount in the arrow C41 or C42 direction is controlled to be reflective of the white balance adjustment.

In a case of, for example, leaving uncancelled the tint in the low color temperature direction by the white balance adjustment, then the colors of the hues around the hue of red of the ideal sunset are rotated toward the hue of red of the ideal sunset as depicted in FIG. 12B, and a sunrise/sunset photograph can thereby be made more impressive.

The offset Oof from the origin can be set for purposes of limiting a range of changing colors.

It is noted that the offset Oof and a parameter for determining the angular ranges of the areas AR41 and AR42 may be modulated using the controlling value. This can realize setting a modulation range based on the tint remaining amount in the white balance adjustment.

Next, FIG. 12C depicts an area of colors other than an area from blue to light blue as an area AR5. In addition, FIG. 12C depicts processing for leaving the area AR5 and reducing saturation of blue and that of light blue to be closer to the achromatic color.

Each arrow C5 indicates that the saturation of hues of blue and light blue is reduced. In such a case, a coefficient for shift in an arrow C5 direction is modulated according to the tint remaining amount A, thereby performing processing using the modulated parameter CR'.

In a case, for example, in which the tint is left uncancelled in the high color temperature direction by the white balance adjustment, saturation of blue and that of light blue are reduced as depicted in FIGS. 12A, 12B, and 12C. It is thereby possible to obtain an impressive captured image that is almost monochromic but has colors such as those of fish and coral other than blue left uncancelled in a photograph of an aquarium or an underwater photograph. Furthermore, in that case, a degree of reduction of the saturation of blue and that of light blue is made variable depending on the white balance adjustment, and thus, an image having an appropriate color balance can be obtained.

It is to be noted that, needless to say, an area other than the area AR5 may be set completely black and white (achromatic), and saturation may be increased or reduced for pixel data concerning the hues contained in the area AR5. In that case, the parameter CR for saturation conversion may be modulated using the tint remaining amount A, and the saturation may be corrected for the pixel data concerning the hues contained in the area AR5, using the modulated parameter CR'.

Furthermore, a parameter for determining an angular range of the area AR5 may be modulated using the controlling value. This can realize setting a range where colors are left uncancelled to be variable depending on the tint remaining amount in the white balance adjustment.

[Color Modulation Based on Face Detection]

An example of using image analysis will next be described. Here, an example in which the image analysis section 25 determines whether or not a person's face is contained in captured image data and in which the controlling value calculation section 23 and the parameter modulation process 24 function in response to such determination will be described.

Figure 13:
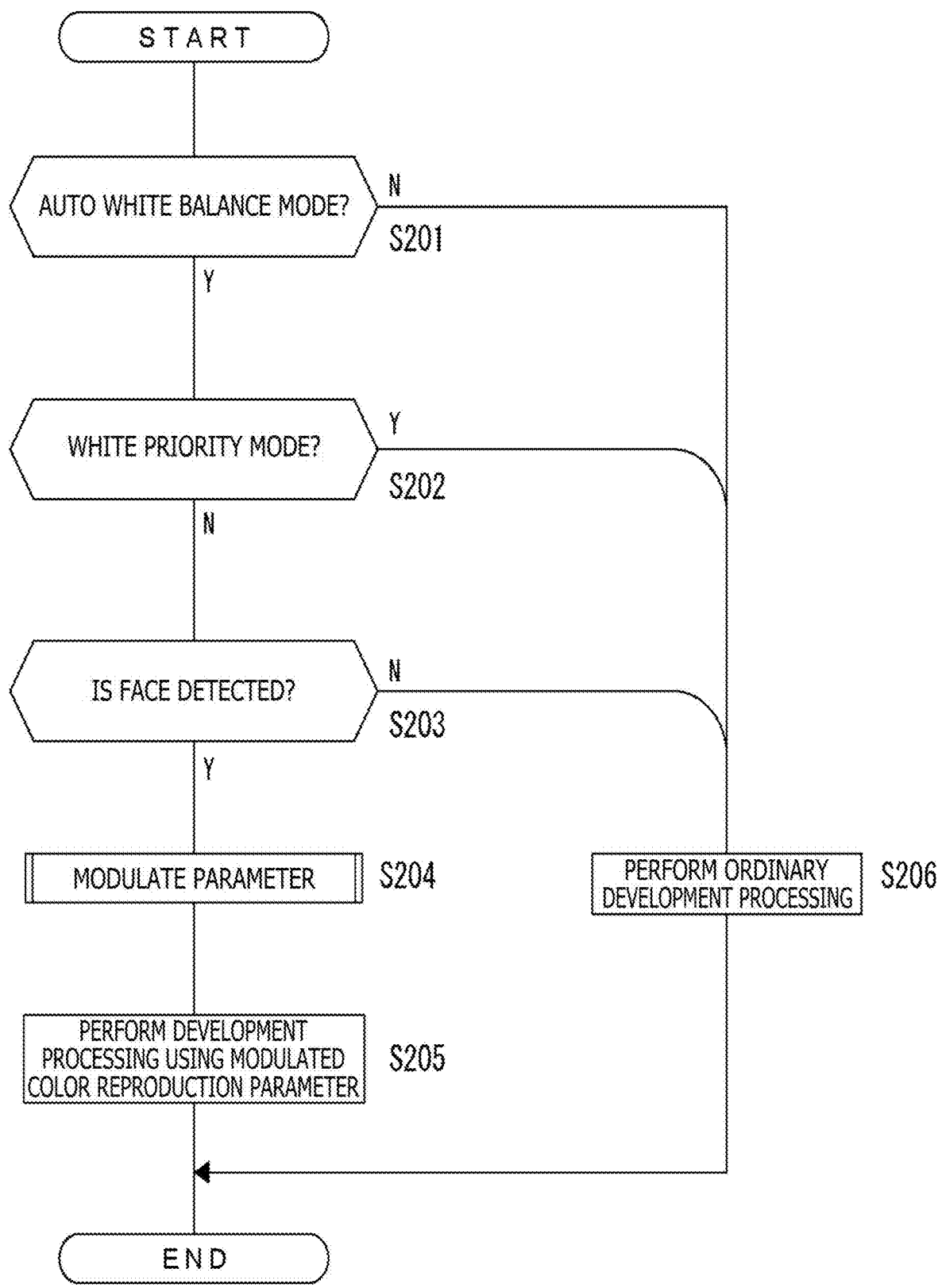
FIG. 13 is a flowchart of parameter modulation processing based on face detection according to the embodiment.

FIG. 13 depicts an example of processing by the image processing apparatus 20 performed by the functions of FIG. 2. The processing of FIG. 13 is performed when, for example, certain captured image data is to be processed.

In Step S201, the image processing apparatus 20 branches off the processing depending on whether or not the current white balance mode is the auto white balance mode.

In a case of the auto white balance mode, the image processing apparatus 20 branches off the processing depending on whether or not the auto white balance mode is the white priority mode, in Step S202.

In a case in which the auto white balance mode is not the white priority mode, for example, in a case in which the auto white balance mode is either the atmosphere priority mode or the standard mode and the tint is to be left uncancelled, the image processing apparatus 20 goes to Step S203, acquires whether or not a person's face is contained in an image, as an image analysis result, and branches off the processing.

In the case in which the current white balance mode is not the auto white balance mode, that is, the fixed white balance mode, in a case in which the current white balance mode is the auto white balance mode but the auto white balance mode is the white priority mode, or in a case in which a face is not detected in the image, then the image processing apparatus 20 goes to Step S206, where the image processing apparatus 20 performs ordinary development processing using the parameter CR.

On the other hand, in a case of confirming that a face is contained in the image in Step S203, the image processing apparatus 20 goes to Step S204, where the image processing apparatus 20 performs parameter modulation processing. For example, in Step S204, the image processing apparatus 20 performs the processing in Steps S101, S102, S103, and S104 of FIG. 5, and obtains the parameter CR' modulated by the controlling value.

In Step S205, the image processing apparatus 20 then performs development processing on the image to be processed, using the parameter CR'.

Figure 14A:
FIGS. 14A, 14B, and 14C depict explanatory diagrams of image processing based on the face detection according to the embodiment.
Figure 14B:
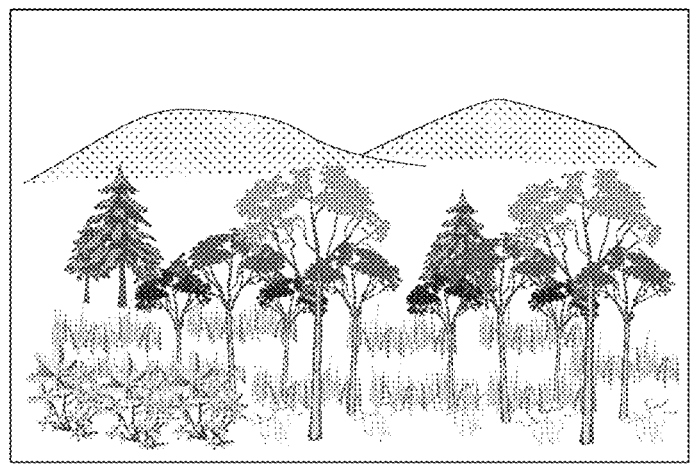

By performing such processing, the image processing apparatus 20 modulates the parameter according to the tint remaining amount A and performs image processing using the modulated parameter CR', only in the case in which a face is contained in an image, for example. For example, FIG. 14A depicts an image that contains a person's face, and FIG. 14B depicts an image that does not contain a person's face. Hatching in FIGS. 14A, 14B, and 14C indicates an area where the image processing is performed using the modulated parameter CR'. In a case of FIG. 14A, the image processing apparatus 20 performs the image processing on the overall image using the parameter CR'. In a case of performing, for example, saturation adjustment only on the skin color area described above, the parameter CR' modulated for the processing of the saturation change is used for pixels of a hue corresponding to the skin color area in the overall image.

It is noted that while the color modulation has been described above by taking a person's face by way of example, needless to say, in a case of detecting a specific subject as detection of a subject by the image analysis, there may be various kinds of examples of processing for performing the image processing on the image using the modulated parameter CR'.

Furthermore, while FIG. 13 depicts processing of using the modulated parameter CR' in the case of the auto white balance mode, this is because the processing has been described as an example in which the tint remaining amount A in the auto white balance mode is dealt with. The processing using the modulated parameter CR' according to detection of a specific subject is also applicable to the case in which the current white balance mode is not the auto white balance mode.

[Color Modulation of Only Face Area]

An example of using the image analysis will similarly be described. Here, an example in which the image processing section 25 determines or not whether a person's face is contained in the captured image data and in which the image processing apparatus 20 performs processing using the modulated parameter CR' with an area of the face assumed as an area to be processed in a case in which the image contains the face, will be described.

Figure 15:
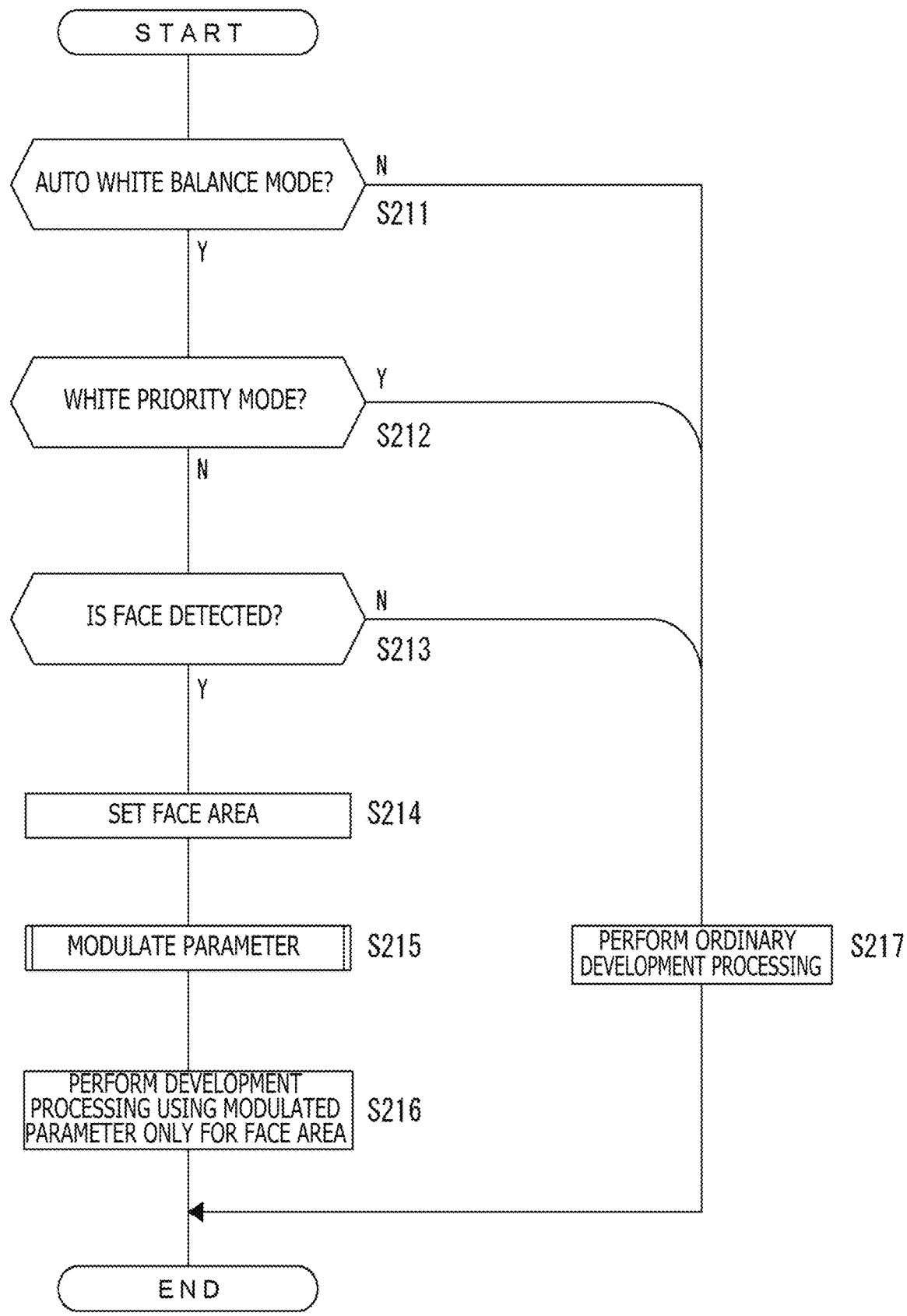
FIG. 15 is a flowchart of image processing using a modulated parameter based on detection of a face area according to the embodiment.

FIG. 15 depicts an example of processing by the image processing apparatus 20 performed by the functions of FIG. 2. The processing of FIG. 15 is performed when, for example, certain captured image data is to be processed.

In Step S211, the image processing apparatus 20 branches off the processing depending on whether or not the current white balance mode is the auto white balance mode.

In the case of the auto white balance mode, the image processing apparatus 20 branches off the processing depending on whether or not the auto white balance mode is the white priority mode, in Step S212.

In the case in which the auto white balance mode is not the white priority mode, for example, in a case in which the auto white balance mode is either the atmosphere priority mode or the standard mode and the tint is to be left uncancelled, the image processing apparatus 20 goes to Step S213, acquires whether or not a person's face is contained in the image, as the image analysis result, and branches off the processing.

In the case in which the current white balance mode is not the auto white balance mode, in a case in which the current white balance mode is the auto white balance mode but the auto white balance mode is the white priority mode, or in a case in which a face is not detected in the image, then the processing goes to Step S217, where the image processing apparatus 20 performs ordinary development processing using the parameter CR.

Figure 14C:

On the other hand, in the case of confirming that a face is contained in the image in Step S213, the image processing apparatus 20 determines an area of a face image within the image to be processed, in Step S214. While FIG. 14C depicts an image that contains a person's face, an interior of a broken line area is determined as a face area ARf.

The image processing apparatus 20 then goes to Step S215, where the image processing apparatus 20 performs parameter modulation processing. For example, the image processing apparatus 20 performs the processing in Steps S101, S102, S103, and S104 of FIG. 5 to obtain the parameter CR' modulated using the controlling value.

In Step S216, the image processing apparatus 20 then performs development processing on the image to be processed, using the parameters CR and CR'. In other words, the image processing apparatus 20 performs image processing using the modulated parameter CR' for pixels within the face area ARf in the image, and performs image processing using the parameter CR for pixels within areas other than the face area ARf.

By performing such processing, the image processing apparatus 20 modulates the parameter according to the tint remaining amount A, and performs image processing by calculating the modulated parameter CR' and using the modulated parameter CR' only on the pixels within the face area ARf, only in the case in which a face is contained in the image, for example. In a case of color processing related to, for example, the skin color, the image processing apparatus 20 processes only the face area ARf according to the tint remaining amount A, and processes skin color parts in a background and the like, using the ordinary parameter CR. Therefore, this example is suitable for a case in which adjustment based on the tint remaining amount by the white balance adjustment is to be performed on a person's skin.

It is noted that while the color modulation has been described above by taking a face by way of example, needless to say, in a case of detecting a specific subject as detection of a subject by the image analysis, there may be various kinds of examples of processing using the modulated parameter CR' locally for the area of the specific subject.

Furthermore, while FIG. 15 depicts processing of using the modulated parameter CR' in the case of the auto white balance mode, this is because the processing has been described as an example in which the tint remaining amount A in the auto white balance mode is dealt with. The processing using the modulated parameter CR' only for the specific image area is also applicable to the case in which the current white balance mode is not the auto white balance mode.

[Processing Based on Light-Emitting Action]

Next, an example of processing combined with a light emission state of the light-emitting apparatus 31 will be described.

Figure 16:
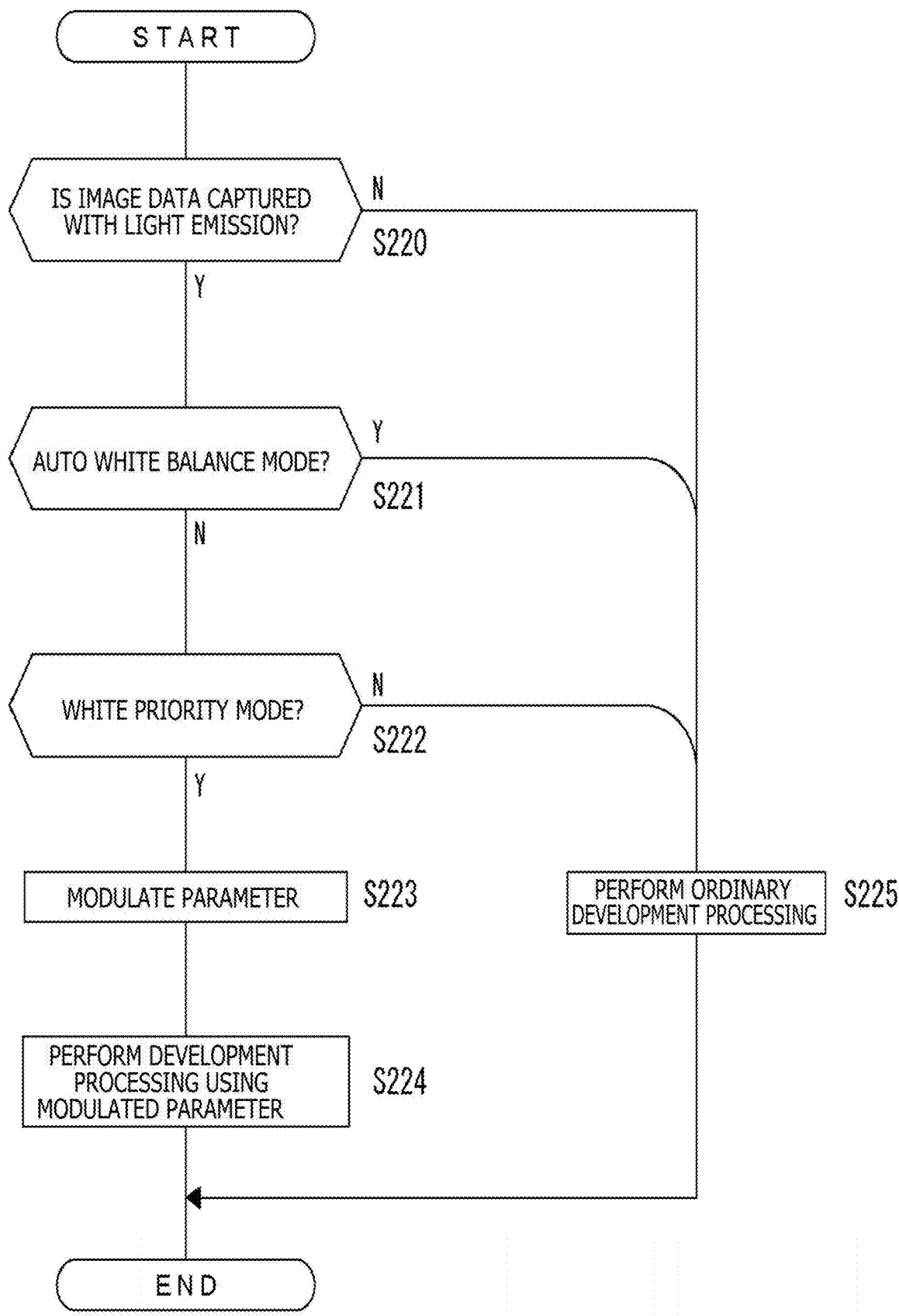
FIG. 16 is a flowchart of parameter modulation processing based on a light emission state of a light-emitting apparatus according to the embodiment.

FIG. 16 depicts an example of processing by the image processing apparatus 20 performed by the functions of FIG. 2. The processing of FIG. 16 is performed when, for example, certain captured image data is to be processed.

In Step S220, the image processing apparatus 20 branches off the processing depending on whether or not image data currently to be processed is captured with flash light emission from the light-emitting apparatus 31 at a time of image capturing. Whether or not the image data is captured with the flash light emission is only required to be detected by, for example, a notification from the control section 30.

In a case in which the image data is captured with the flash light emission, the image processing apparatus 20 branches off the processing depending on whether or not the current white balance mode is the auto white balance mode, in Step S221.

In the case of the auto white balance mode, the image processing apparatus 20 branches off the processing depending on whether or not the auto white balance mode is the white priority mode, in Step S212.

In a case in which the image to be processed is not the image captured with the flash light emission at the time of image capturing, in a case in which the current white balance mode is not the auto white balance mode, or in a case in which the current white balance mode is the auto white balance mode but the auto white balance mode is the white priority mode, the image processing apparatus 20 goes to step S225, where the image processing apparatus 20 performs ordinary development processing using the parameter CR.

In a case in which it is determined in Step S225 that the auto white balance mode is not the white priority mode, for example, in a case in which the auto white balance mode is either the atmosphere priority mode or the standard mode and the tint is to be left uncancelled, the image processing apparatus 20 goes to Step S223, performs the parameter modulation processing (for example, the processing in Steps S101, S102, S103, and S104 of FIG. 5), and obtains the parameter CR' modulated using the controlling value.

In Step S224, the image processing apparatus 20 then performs development processing on the image to be processed, using the parameter CR'.

By performing such processing, the image processing apparatus 20 modulates the parameter according to the tint remaining amount A, and performs image processing by calculating the modulated parameter CR' and using the modulated parameter CR', only for the image captured with the flash light emission, for example.

It is noted that, conversely, an example of performing imaging processing using the modulated parameter CR' in a case in which the image is not captured with the flash light emission, is possible.

In addition, such an example of processing based on light emission is also applicable to cases other than the auto white balance mode.

[Modulation of Color Reproduction by Combination of 3D-LUT (Look Up Table) and Tint Remaining Amount]

The color reproduction parameter CR may be modulated by a combination of 3D-LUT and the tint remaining amount A.

It is, for example, well known to use the 3D-LUT as the color correction processing. For example, the 3D-LUT is referred to with input R, G, and B values and output R, G, and B values are obtained, thereby realizing any kind of color correction.

In this case, the parameter CR as selection of the 3D-LUT or a coefficient or the like for the output values may be modulated according to the tint remaining amount A, and the modulated parameter CR' may be used at the time of color correction processing using the 3D-LUT.

For example, in a case of leaving blue of the light source on purpose by the white balance at a time of capturing an image of a natural landscape with the high color temperature light source (shade or the like), it is possible to represent a deeper color of the sky and deeper green by increasing the saturation of blue and that of green and decreasing the values thereof by the 3D-LUT.

[Modulation of Parameters Other than Parameter for Use in Color Processing]

Next, an example of modulating the parameter CR used in, for example, luminance processing in a case of modulating parameters other than that used in the color processing will be described. Here, contrast adjustment, sharpness adjustment, and contrast/brightness adjustment using a tone curve will be described.

It is noted that the contrast adjustment is performed by the gamma correction section 59 of FIGS. 3A and 3B, and the sharpness adjustment is performed by the aperture control processing section 56.

Modulation based on the tint remaining amount A may be performed with respect to a RAW development parameter used in contrast (gamma correction), sharpness, or the like.

For example, in a case of capturing an image of an artificial object such as a building with the high color temperature light source (shade or the like) and leaving blue of the light source uncancelled on purpose by the white balance, it is possible to further reinforce a cool impression of the artificial object by increasing the contrast and enhancing the sharpness.

Therefore, a contrast adjustment parameter CRc and a sharpness adjustment parameter CRs are modulated according to the tint remaining amount A to obtain parameters CRc' and CRs', and the gamma correction section 59 performs the contrast adjustment and the aperture control processing section 56 performs the sharpness adjustment using these parameters CRc' and CRs', respectively.

It is noted that as the priority setting at the time of ordinary auto white balance (AWB) mode (standard/atmosphere priority/white priority) as described with reference to FIG. 4A, it is impossible to independently change each of low color temperature side setting and high color temperature setting.

To address the problem, "priority setting at time of AWB with high color temperature light source" is newly prepared in addition to "priority setting at time of AWB with low color temperature light source," as the priority setting of white balance as depicted in, for example, FIGS. 4A and 4B.

This "priority setting at time of AWB with low color temperature light source" enables the user to select "standard," "atmosphere priority," or "white priority" as the setting to leave uncancelled the low color temperature side tint. In addition, the "priority setting at time of AWB with high color temperature light source" enables the user to select "standard," "atmosphere priority," or "white priority" as the setting to leave uncancelled the high color temperature side tint.

Preparing the modes in this way makes it possible to independently select any of the setting to leave uncancelled orange of the light source with the low color temperature light source and the setting to leave uncancelled blue of the light source with the high color temperature light source.

It is noted that in this case, the user may be allowed to select any of 3×3, that is, nine types, of modes which include three modes (standard/atmosphere priority/white priority) as the priority setting at the time of the AWB with the low color temperature light source and three modes (standard/atmosphere priority/white priority) as the priority setting at the time of the AWB with the high color temperature light source.

Furthermore, the priority setting at the time of the AWB with the low color temperature light source is effective for an image captured indoor with a light bulb light source. On the other hand, the priority setting at the time of the AWB with the high color temperature light source is effective for an image captured in the shade or the like on a sunny day.

Next, a method of correcting the overall contrast or brightness of an image by a tone curve by the gamma correction section 59 will be described.

Modulation based on the tint remaining amount A may be performed on a tone curve.

For example, at a time of capturing an image of a person with the low color temperature light source (such as a light bulb), orange of the light source is sometimes left uncancelled on purpose by the white balance. In such a case, suppressing the brightness of the image by the tone curve makes it possible to further reinforce the impression with an atmosphere of the light source being left.

While the gamma correction section 59 is a circuit that can set an output value with respect to a certain input per pixel for each input value, this circuit can not only realize a function of cancelling input/output characteristics of the display apparatus as an original purpose of the gamma correction but can also realize a function of changing the overall contrast or brightness of the image. This function of changing the contrast or brightness of the image is referred to as a "tone curve."

Figure 17:
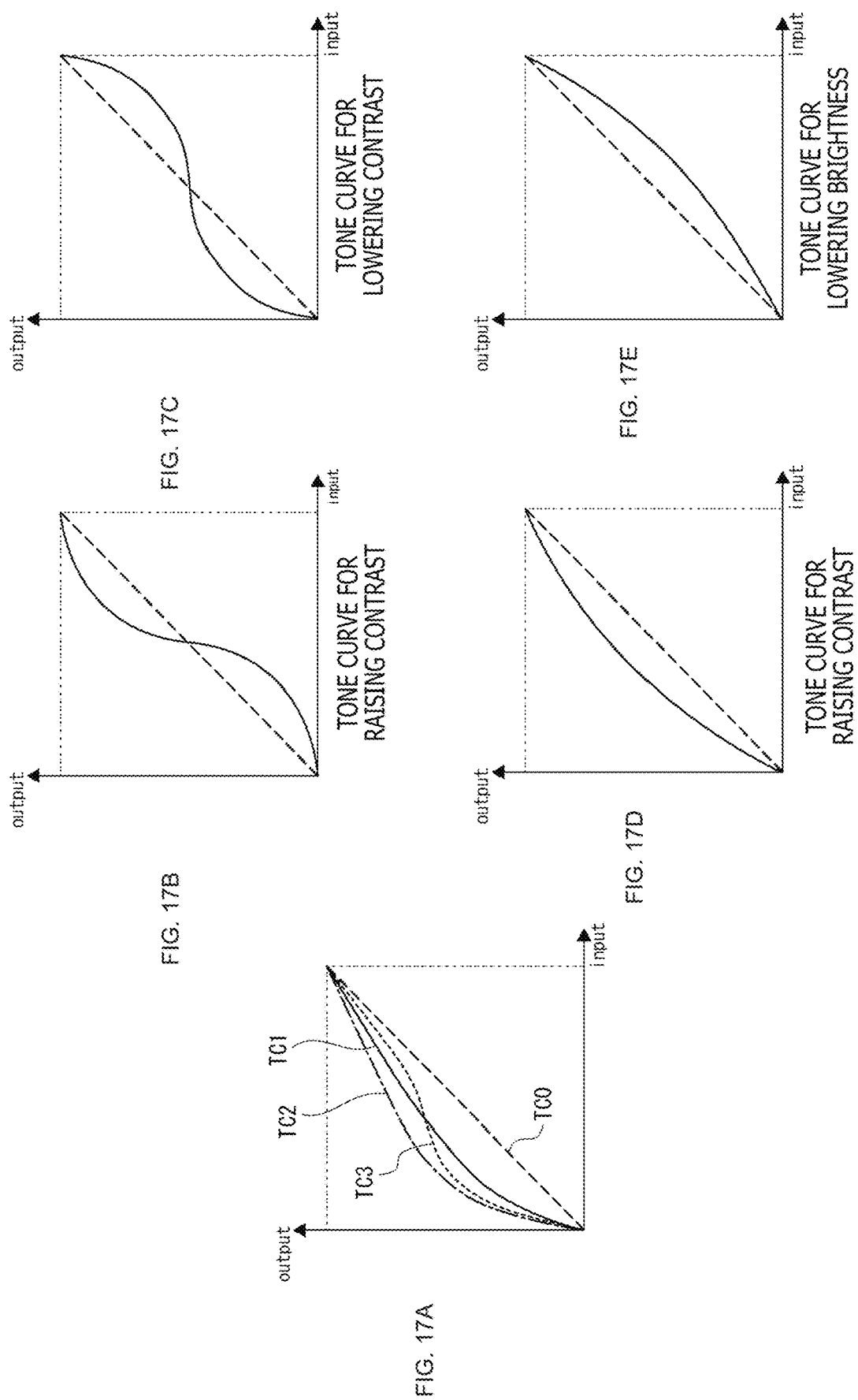
FIGS. 17A, 17B, 17C, 17D, and 17E depict explanatory diagrams of an example of application of the embodiment to tone curve processing.

By way of example, FIGS. 17B, 17C, 17D, and 17E depict tone curves of four patterns including raising and lowering the contrast and raising and lowering the brightness. In each of FIGS. 17B, 17C, 17D, and 17E, a horizontal axis indicates an input value and a vertical axis indicates an output value. FIG. 17B is the tone curve for raising the contrast, FIG. 17C is the tone curve for lowering the contrast, FIG. 17D is the tone curve for raising the brightness, and FIG. 17E is the tone curve for lowering the brightness.

Furthermore, FIG. 17A depicts an example of curves obtained by multiplying the gamma correction in the display apparatus by the curves for raising the brightness and lowering the contrast.

In FIG. 17A, a broken line (TC0) indicates characteristics that $\gamma=1$ and an input and an output do not change.

A solid-line tone curve TC1 is a gamma curve ($\gamma=2.2$) for cancelling the input/output characteristics of the display apparatus.

A chain-line tone curve TC2 is obtained by multiplying the gamma curve as the tone curve TC1 by the curve for raising the brightness depicted in FIG. 17D. In other words, the tone curve TC2 is a curve for simultaneously performing the gamma correction and brightness raising.

A dotted-line tone curve TC3 is obtained by multiplying the gamma curve as the tone curve TC1 by the curve for lowering the contrast depicted in FIG. 17C. In other words, the tone curve TC3 is a curve for simultaneously performing the gamma correction and contrast lowering.

Modulating the curve (input/output characteristics) according to the tint remaining amount A in processing using such tone curves makes it possible to perform the contrast adjustment and the brightness adjustment by reflecting the tint remaining amount A.

<4. Example of Application to Printer>

A configuration of a printer mounting therein the image processing apparatus according to the present technology will be described below as a second embodiment.

Figure 18:
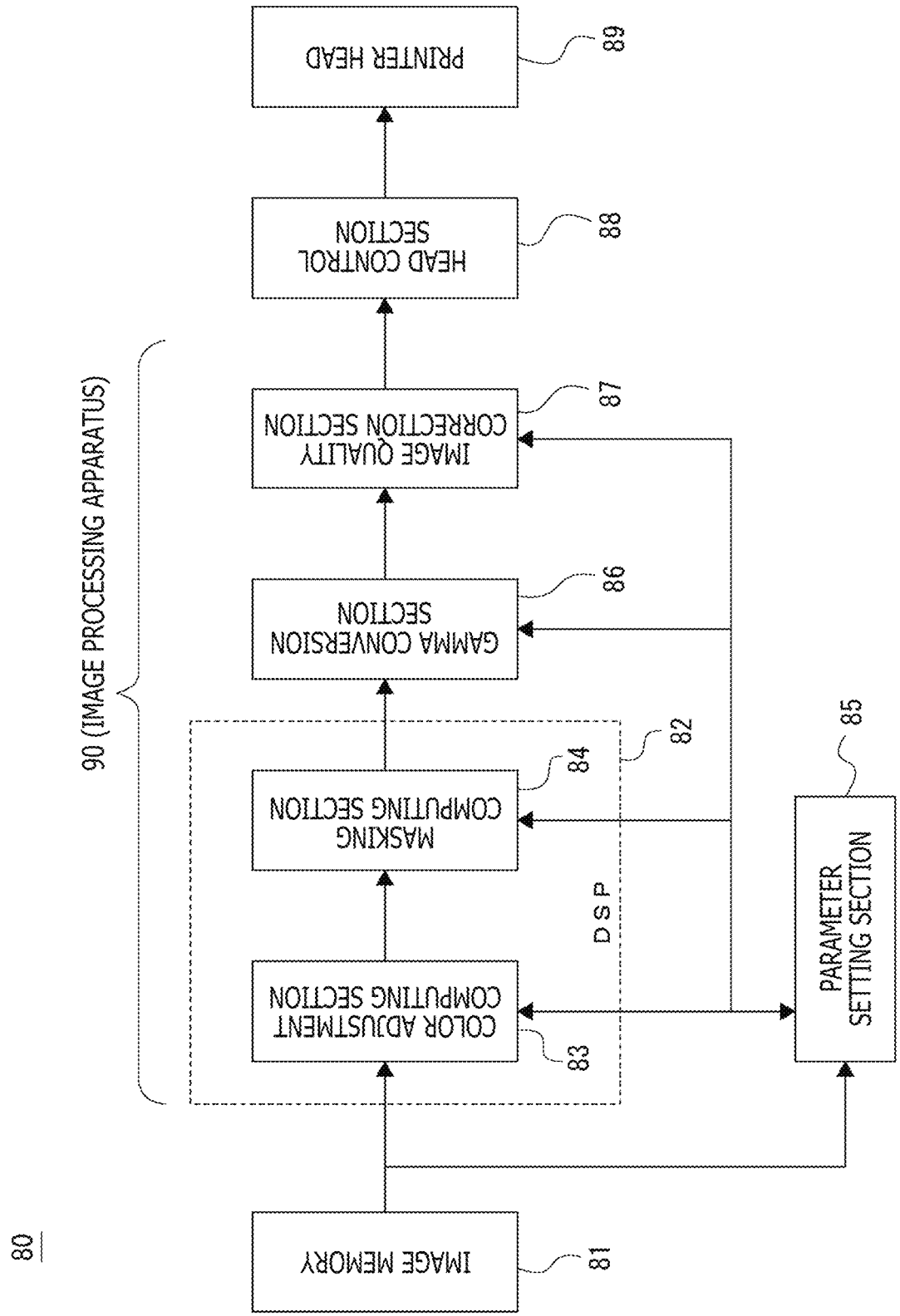
FIG. 18 is a block diagram of a printer according to the embodiment.

FIG. 18 is a block diagram of a printer 80. In this example, an image processing apparatus 90 of FIG. 1 corresponds to an image processing apparatus set forth in the claims.

The printer 80 includes an image memory 81, a digital signal processing section 82, a parameter setting section 85, a gamma conversion section 86, an image quality correction section 87, a head control section 88, and a printer head 89.

It is noted that there may be various kinds of printer heads as the printer head 89, and a thermal printer, an ink jet printer, a laser printer, or the like is assumed to be the printer 80, depending on a head type.

The image memory 81 is a storage device that temporarily holds image data input for printing. Here, while a semiconductor memory is used as the image memory 81, a magnetic storage device such as a hard disk device or other storage devices can be used as the image memory 81. It is noted that the image data is given as RGB data.

The digital signal processing section 82 is a processing device that realizes color adjustment processing and processing for conversion to YMC (yellow/magenta/cyan) data by computing processing. The digital signal processing section 82 is realized by, for example, a microprocessor.

The digital signal processing section 82 includes a color adjustment computing section 83 and a masking computing section 84.

Out of the constituent elements, the color adjustment computing section 83 executes color adjustment on an HSV color space (color space formed from hue, saturation, and value). Computing processing executed by the color adjustment computing section 83 includes processing for converting RGB data into HSV data, color adjustment processing performed on the data-converted HSV data, and processing for converting the color-adjusted HSV data into RGB data.

The masking computing section 84 performs computing processing for converting the RGB data into YMC data suited for printing.

High computing accuracy can be expected from a method of realizing the color adjustment processing by the computing processing in the digital signal processing section 82 only if a computing speed of a processing device (microprocessor) is sufficiently high.

The parameter setting section 85 is a processing device that sets parameters corresponding to a content of the color adjustment executed on the HSV space.

It is noted that the parameters include four types of parameters including the hue, the saturation, the value, and a degree of change in a designated phase range.

In a case of the present embodiment, the parameter setting section 85 has functions as the controlling value calculation section 23 and the parameter modulation process 24 depicted in FIG. 2. Furthermore, the parameter setting section 85 may have a function as the image analysis section 25.

The gamma conversion section 86 is a processing device that performs input/output conversion such that a gray level of an image reproduced through an output device is linear. In a case of this example, the gamma conversion section 86 executes conversion processing in such a manner as to cancel gamma characteristics unique to the printer head.

The image quality correction section 87 is a processing device that executes contour correction and well-known correction processing for improving sharpness and other image qualities.

The head control section 88 is a processing device that executes control actions (supply of a current to a heating body in a case of, for example, a thermal head) necessary for driving the printer head 89.

The printer head 89 performs a printing action on a printer sheet. In a case of, for example, the thermal head, the printer head 89 is a device having a heating element arranged over a print width. For color image printing, an ink film obtained by applying a sublimation material to a film is used.

In such a printer 80, the parameter setting section 85 can similarly modulate parameters for various kinds of processing according to image data to be printed. In other words, the parameter setting section 85 calculates the first and second white balance gains, calculates the controlling value, and modulates the parameter CR for image processing according to the controlling value, with respect to the image data. The parameter setting section 85 then supplies the modulated parameter CR' to the color adjustment computing section 83, the masking computing section 84, the gamma conversion section 86, the image quality correction section 87, and the like, and can cause the color adjustment computing section 83, the masking computing section 84, the gamma conversion section 86, the image quality correction section 87, and the like to execute image processing using the parameter CR'.

This can realize more advanced image processing reflective of the white balance gain.

It is noted that the processing performed by the image processing apparatus 90 described above may be performed by a printer driver installed in a computer apparatus.

For example, the printer driver performs processing for calculating the controlling value using the first and second white balance gains.

Alternatively, the printer driver performs processing for calculating the controlling value and processing for modulating the parameter CR for image processing according to the controlling value.

Alternatively, the printer driver performs processing for calculating the controlling value, processing for modulating the parameter CR for image processing according to the controlling value, and image processing using the modulated parameter CR'.

As described above, software that is the printer driver may realize the image processing apparatus according to the present technology to be applied to an image to be printed.

CONCLUSION AND MODIFICATIONS

As described so far, the image processing apparatus 20 or 90 is mounted in the imaging apparatus 1 or the printer 80 according to the embodiments. In addition, the image processing apparatus (20, 90) according to the embodiments includes the controlling value calculation section 23 that calculates the controlling value using the first white balance gain and the second white balance gain, and the parameter modulation section 24 that modulates the image processing parameter CR using the controlling value (tint remaining amount A, for example) calculated by the controlling value calculation section 23.

As described above, calculating the controlling value using the first and second white balance gains and modulating the parameter CR of some sort in the course of the image processing using the controlling value make it possible to provide an unprecedented image processing scheme that is image processing (image adjustment, image effect, and the like) on a captured image based on the white balance gain. It is thereby possible to realize image processing capable of generating a higher quality image.

While the controlling value reflective of the tint remaining amount A is obtained using the first white balance gain and the second white balance gain in the embodiments, the controlling value is not limited to the value reflective of the accurate tint remaining amount A.

For example, in the case of assuming that the first white balance gain is a reference and the second white balance gain is a gain to be actually used in the white balance control, there may be various ways to set the reference (first white balance gain). In other words, the first white balance gain is not limited to the white balance gain for completely cancelling the tint of the light source at the time of image capturing. Therefore, the first white balance gain may be a value with a certain amount of color temperature shift being intended or a value set by the user.

Furthermore, there may be various examples including not only the tint remaining amount A that is the difference between the first and second white balance gains but also values reflective of a multiplication value, a division value, an addition value, an average value, and the like for the first and second white balance gains, as the controlling value.

In the embodiments, the example in which the image processing apparatus 20 also performs processing for calculating the first white balance gain based on the image to be processed has been described (S101 of FIG. 5, and the like).

As a result of such processing, it is possible to obtain the first white balance gain based on the image to be processed and set the calculated controlling value as a value for parameter modulation based on a content of the image to be processed.

It is noted that the first white balance gain may be a fixed value. Alternatively, the first white balance gain may be selected from one of several values stored.

In the embodiments, the example in which the image processing apparatus 20 also performs processing for calculating the second white balance gain based on the image to be processed has been described (S102 of FIG. 5, and the like).

As a result of such processing, it is possible to obtain the second white balance gain based on the image to be processed and set the calculated controlling value as the value for parameter modulation based on the content of the image to be processed.

It is noted that the second white balance gain may be a fixed value. Alternatively, the second white balance gain may be selected from one of several values stored.

In the embodiments, the example in which the first white balance gain is the white balance gain for adjusting the tint of the light source at the time of capturing the image to be processed in the direction of cancelling the tint, the second white balance gain is the white balance gain for adjusting the tint of the light source at the time of capturing the image to be processed in the direction of leaving the tint uncancelled, compared with the first white balance gain, and the controlling value calculated by the controlling value calculation section 23 is the controlling value reflective of the tint remaining amount of the light source has been described. In other words, the controlling value is either the tint remaining amount A or the tint remaining coefficient A'.

The controlling value is thereby a value based on the tint remaining amount of the content of the image to be processed, and using this controlling value as the value for parameter modulation in the image processing or the like makes it possible to realize the image processing based on the tint remaining amount by the white balance adjustment.

It is noted that while the tint remaining amount A is obtained from the first white balance gain for cancelling the tint of the light source and the second white balance gain for leaving uncancelled the tint of the light source in the auto white balance mode in the embodiments, the technology according to the embodiments is also applicable to the modes other than the auto white balance mode.

For example, as already described, the user can select "sunlight," "shade," "cloudy weather," "fluorescent light (warm white/white/neutral white/daylight)," "flash," "underwater," or the like as the white balance mode. In a case in which the user can further adjust the white balance gain in any of those modes, the white balance gain set in any of the modes is assumed as the first white balance gain and the white balance gain adjusted by the user is assumed as the second white balance gain, thereby making it possible to calculate the controlling value reflective of the difference in color in each mode. Accordingly, performing parameter modulation using the controlling value makes it possible to realize advanced image processing.

In the embodiments, the example in which the image processing apparatus 20 includes the image signal processing section 21 that performs processing on image data using the image processing parameter CR' modulated using the controlling value has been described.

Diverse contents of processing may be performed on the image data including the colors, the luminance, the contrast, the sharpness, and the like of the image data. Furthermore, the processing performed on the image data may include, for example, image development processing, processing for storage, processing for reproduction and display, processing for transmission, and processing for printing.

The image processing parameter CR used in such various kinds of image data processing is modulated by the controlling value generated using the white balance gain, and the image signal processing section 21 and the like perform predetermined image processing using the modulated image processing parameter CR'.

Accordingly, it is possible to execute the image data processing based on the white balance gain (for example, reflective of the tint remaining amount) and to perform the processing suited for the light source color at the time of image capturing.

In the embodiments, the example in which the image processing apparatus 20 includes the output processing section 22 that performs processing for outputting the image processing parameter CR' modulated using the controlling value in such a manner as to be stored in the storage medium 15*a* has been illustrated (refer to FIG. 8A).

This enables acquisition of the modulated parameter CR' corresponding to the image data at any timing. Therefore, it is possible to perform image data processing using the parameter CR' on, for example, the image data that is read put from the storage medium 15*a* or that is input by a scheme of some sort at a later timing. In other words, even an apparatus that does not have a parameter modulation function can perform processing using the parameter CR' modulated to be reflective of the controlling value obtained from the white balance gain.

It is noted that storing the controlling value as depicted in FIG. 8B also makes it possible to perform parameter modulation using the controlling value at later timing and to use the modulated parameter CR'.

In the embodiments, the example in which the image processing apparatus 20 includes the output processing section 22 that performs processing for transmitting the image processing parameter CR' modulated using the controlling value to an external apparatus has been illustrated (refer to FIG. 9A).

Such configuration makes it possible for the external apparatus to acquire the modulated parameter CR' corresponding to the image data. Therefore, the external apparatus can perform image processing on the image data based on the white balance gain, using the parameter CR'.

It is noted that transmitting the controlling value as depicted in FIG. 9B also makes it possible for the external apparatus to perform parameter modulation using the controlling value and to use the modulated parameter CR'.

In the embodiments, the example in which the second white balance gain is set using user input information has been described (refer to FIG. 7).

The controlling value can thereby be set to, for example, the value reflective of the difference between the first white balance gain (original gain for white balance adjustment, for example) and the user's desired white balance gain for the white balance adjustment, or the like.

Accordingly, the controlling value can be set to the value for parameter modulation based on user's intention regarding the white balance adjustment with respect to the image to be processed, and image processing adaptive to the user's desired white balance can be realized.

In the embodiments, the example in which the image processing apparatus 20 includes the image analysis section 25, and in which calculation of the controlling value by the controlling value calculation section 23 and modulation of the image processing parameter by the parameter modulation section 24 are executed according to the analysis result of the image analysis section 25 has been described (refer to FIG. 13).

The image analysis section 25 determines a specific image condition (whether or not a face is contained in the image, for example), and decides whether or not to modulate the image processing parameter according to such determination. Therefore, modulating the image processing parameter only on the specific image condition makes it possible to execute appropriate image processing based on the specific image condition. For example, the image processing parameter can be modulated according to face detection in such a manner that a tone of a color of the face is changed to a favorable tone of a color. Accordingly, it is possible to provide a higher quality image to the user.

Furthermore, applying the present technology only to image processing intended to exercise user's color control over the facial image, in particular, can save processing for calculating the controlling value and modulating the image processing parameter, and therefore, contributes to reducing a processing burden.

It is noted that as the image condition for the image analysis, it is possible to not only determine whether or not the face or a specific subject is present but to also determine each of subjects, size of each subject, brightness of an image, a degree of blurring of the image, an atmosphere of the image, or the like, and to decide whether or not to modulate the image processing parameter according to each of these conditions.

In the embodiments, the example in which the image processing apparatus 20 includes the image analysis section 25, and in which the image signal processing section 21 uses the image processing parameter CR' modulated by the parameter modulation section 24 for signal processing on an area identified by the analysis result of the image analysis section 25 within the image to be processed has been described (refer to FIG. 15).

The image analysis section 25 determines a specific image area (an area, for example, in which a person's face, a person, an animal, the sky, the sea, or the like appears), and the image processing parameter CR' modulated is used for the area. It is therefore possible to execute appropriate image processing different from that on other subjects, on the specific subject. For example, it is possible to execute advanced image processing in such a manner that the tone of the color of the face is changed to the favorable tone of the color only in the face area according to the face detection while the background and the like are not subjected to color adjustment.

Furthermore, in a case in which a subject of interest is not present, not calculating the controlling value and not modulating the image processing parameter contribute to reducing a processing burden.

In the embodiments, the example in which calculation of the controlling value by the controlling value calculation section 23 and modulation of the image processing parameter by the parameter modulation section 24 are executed according to an operating state of the light-emitting apparatus 31 at a time of capturing the image to be processed has been described (refer to FIG. 16).

For example, performing image processing using the modulated image processing parameter CR' in the case of light emission at the time of capturing the image makes it possible to realize image processing based on light emission.

It is noted that conversely, image processing may be performed using the modulated image processing parameter CR' in the case of no light emission at the time of image capturing. It is possible to perform the image processing based on the light emission situation regardless of whether or not light is emitted at the time of image capturing.

Furthermore, an apparatus that can perform such processing is not limited to the imaging apparatus 1 including the light-emitting apparatus 31. For example, information regarding presence/absence of flash light emission is added to the image data, as information at the time of image capturing. At the time of the image processing, it may be determined whether or not to modulate the image processing parameter by referring to the information. It is thereby possible to perform the image processing based on the light emission state regardless of whether the apparatus is other than the imaging apparatus 1 or the image processing is performed at a time other than the time of image capturing.

In the embodiments, the white balance gain used in a first white balance mode for cancelling the tint of the light source at the time of capturing the image to be processed as the first white balance gain, and a white balance gain used in a second white balance mode for leaving uncancelled the tint of the light source at the time of capturing the image to be processed as the second white balance gain have been illustrated exemplarily. In addition, the example in which the controlling value calculation section 23 calculates the controlling value in a case in which an image for which the second white balance mode is selected for white balance adjustment is the image to be processed has been described.

Specifically, the first white balance gain is the white balance gain for ordinary white balance processing, that is, for the white balance adjustment for cancelling the tint of the light source. For example, the white balance gain in the white priority mode corresponds to the first white balance gain.

On the other hand, the atmosphere priority mode and the standard mode are prepared in the imaging apparatus 1, and the white balance gain in the atmosphere priority mode (or standard mode) corresponds to the second white balance gain. FIGS. 13 and 15 depict, as the processing, the example in which the controlling value is calculated and the parameter modulation is performed using the controlling value when the mode of using the second white balance gain is selected in such way.

Performing parameter modulation using the controlling value on the image subjected to the white balance adjustment by the second white balance gain different from the ordinary (first) white balance gain in such way makes it possible to realize image processing adaptive to the image obtained in the second white balance mode. This can improve an image quality.

In the embodiments, the example in which the image processing parameter CR modulated using the controlling value is a parameter for use in color processing on the image data has been illustrated. In other words, the parameter for adjustment of a hue or saturation or the like is modulated according to the white balance gain.

This can realize more advanced color processing such as color processing highly compatible with the white balance adjustment to be executed.

In the embodiments, the example in which the image processing parameter CR modulated using the controlling value is a parameter for use in processing for modulating a specific hue of the image data has been described (refer to FIGS. 10A 10B, 11A, 11B, 12A, 12B, and 12C).

For example, the parameter used in processing for shifting pixel data in a specific hue area to the specific hue or adjusting the saturation of the specific hue area is modulated according to the white balance gain.

This can realize more advanced color processing such as color processing highly compatible with the white balance adjustment to be executed, which is, for example, processing for correcting or changing the color of an area to be left uncancelled regardless of the white balance adjustment. It is particularly possible to adjust a specific hue area into a favorable color state.

In the embodiments, the example in which the image processing parameter CR modulated using the controlling value is a parameter for use in development processing other than color processing has been described.

For example, a development processing parameter (for example, parameter for luminance processing) other than the color processing parameter, such as a parameter for processing using contrast (gamma correction), brightness, sharpness, or a tone curve is modulated according to the white balance gain.

This can realize more advanced image processing such as contrast adjustment or sharpness adjustment highly compatible with the white balance adjustment to be executed.

While the example in which the image processing apparatus (20, 90) according to the embodiments is mounted in the imaging apparatus 1 or the printer 80 has been described, the image processing apparatus (20, 90) can be mounted in other apparatuses. It is assumed, for example, that the image processing apparatus (20, 90) is mounted in an image processing dedicated apparatus, an image editing apparatus, an information processing apparatus (personal computer or mobile terminal), a television receiver, a monitor apparatus, or a projection apparatus.

Furthermore, while a still image has been described as the image to be processed in each embodiment, the present technology is also applicable to a case of using a moving image as the image to be processed.

A program according to the embodiments is a program causing an arithmetic processing unit to execute a controlling value calculation step of calculating a controlling value using a first white balance gain and a second white balance gain, and a parameter modulation step of modulating an image processing parameter using the controlling value calculated in the controlling value calculation step.

In other words, the program is a program causing the arithmetic processor to execute the processing of FIGS. 5, 7, 8A, 8B, 9A, 9B, and the like.

Such a program facilitates realization of the image processing apparatus 20 (90) according to the present embodiments.

In addition, such a program can be stored in advance in a storage medium incorporated in an apparatus such as a computer apparatus, a ROM within a microcomputer that has a CPU, or the like. Alternatively, the program can be saved (stored) in a removable storage medium such as a semiconductor memory, a memory card, an optical disk, a magneto-optical disk, or a magnetic disk, either temporarily or permanently. Moreover, such a removable storage medium can be provided as what is generally called package software.

Furthermore, such a program can be installed from the removable storage medium into a personal computer or the like, or can be downloaded from a download website via a network such as a LAN or the Internet.

It is noted that the effects described in the present specification are given as an example only, and the effects are not limited to those described in the present specification and may contain other effects.

It is noted that the present technology can also be configured as follows.

(1) An image processing apparatus including:
a controlling value calculation section that calculates a controlling value using a first white balance gain and a second white balance gain; and
a parameter modulation section that modulates an image processing parameter using the controlling value calculated by the controlling value calculation section.

(2) The image processing apparatus according to (1), in which
the controlling value calculation section also performs processing for calculating the first white balance gain based on an image to be processed.

(3) The image processing apparatus according to (1) or (2), in which
the controlling value calculation section also performs processing for calculating the second white balance gain based on the image to be processed.

(4) The image processing apparatus according to any one of (1) to (3), in which
the first white balance gain includes a white balance gain for adjusting a tint of a light source at a time of capturing the image to be processed, in a direction of cancelling the tint,
the second white balance gain includes a white balance gain for adjusting the tint of the light source at the time of capturing the image to be processed in a direction of leaving uncancelled the tint, compared with the first white balance gain, and
the controlling value calculated by the controlling value calculation section includes a controlling value reflective of a tint remaining amount of the light source.

(5) The image processing apparatus according to any one of (1) to (4), including:
an image signal processing section that performs processing on image data using the image processing parameter modulated using the controlling value.

(6) The image processing apparatus according to any one of (1) to (5), including:
an output processing section that performs processing for outputting the image processing parameter modulated using the controlling value, as information to be stored in a storage medium.

(7) The image processing apparatus according to any one of (1) to (6), including:
an output processing section that performs processing for outputting the image processing parameter modulated using the controlling value, as information to be transmitted to an external apparatus.

(8) The image processing apparatus according to any one of (1), (2), (4), (5), (6), and (7), in which
the controlling value calculation section sets the second white balance gain using user input information.

(9) The image processing apparatus according to any one of (1) to (8), including:
an image analysis section, in which
calculation of the controlling value by the controlling value calculation section and modulation of the image processing parameter by the parameter modulation section are executed according to an analysis result of the image analysis section.

(10) The image processing apparatus according to (5), including:
an image analysis section, in which
the image signal processing section uses the image processing parameter modulated by the parameter modulation section for signal processing on an area identified by an analysis result of the image analysis section within the image to be processed.

(11) The image processing apparatus according to any one of (1) to (10), in which
calculation of the controlling value by the controlling value calculation section and modulation of the image processing parameter by the parameter modulation section are executed according to an operating state of a light-emitting apparatus at a time of capturing the image to be processed.

(12) The image processing apparatus according to any one of (1) to (11), in which
the first white balance gain includes a white balance gain used in a first white balance mode for cancelling the tint of the light source at the time of capturing the image to be processed,
the second white balance gain includes a white balance gain used in a second white balance mode for leaving uncancelled the tint of the light source at the time of capturing the image to be processed, and the controlling value calculation section calculates the controlling value in a case in which an image for which the second white balance mode is selected for white balance adjustment is the image to be processed.

(13) The image processing apparatus according to any one of (1) to (12), in which the image processing parameter modulated using the controlling value is a parameter for use in color processing on the image data.

(14) The image processing apparatus according to any one of (1) to (13), in which the image processing parameter modulated using the controlling value includes a parameter for use in processing for modulating a specific hue of the image data.

(15) The image processing apparatus according to any one of (1) to (14), in which the image processing parameter modulated using the controlling value includes a parameter for use in development processing other than color processing.

(16) An image processing method executed by an arithmetic processor, including:

a controlling value calculation procedure of calculating a controlling value using a first white balance gain and a second white balance gain; and a parameter modulation procedure for modulating an image processing parameter using the controlling value calculated by the controlling value calculation procedure.

(17) A program for an arithmetic processor, including:

a controlling value calculation step of calculating a controlling value using a first white balance gain and a second white balance gain; and a parameter modulation step of modulating an image processing parameter using the controlling value calculated in the controlling value calculation step.

(18) The program according to (17), in which in the controlling value calculation step, the arithmetic processor is also caused to execute processing for calculating the first white balance gain based on an image to be processed.

(19) The program according to (17) or (18), in which in the controlling value calculation step, the arithmetic processor is also caused to execute processing for calculating the second white balance gain based on an image to be processed.

(20) The program according to any one of (17) to (19), in which the first white balance gain includes a white balance gain for adjusting a tint of a light source at a time of capturing the image to be processed, in a direction of cancelling the tint, the second white balance gain includes a white balance gain for adjusting the tint of the light source at the time of capturing the image to be processed, in a direction of leaving uncancelled the tint, compared with the first white balance gain, and the controlling value calculated in the controlling value calculation step includes a controlling value reflective of a tint remaining amount of the light source.

REFERENCE SIGNS LIST

1 . . . Imaging apparatus, 11 . . . Optical system, 12 . . . Image sensor, 13 . . . Optical system drive section, 14 . . . Sensor section, 15 . . . Storage section, 15a . . . Storage medium, 16 . . . Communication section, 17 . . . Display section, 18 . . . Operation section, 19 . . . Viewfinder, 20, 90 . . . Image processing apparatus, 21 . . . Image signal processing section, 22 . . . Output processing section, 23 . . . Controlling value calculation section, 24 . . . Parameter modulation process, 25 . . . Image analysis section, 30 . . . Control section, 80 . . . Printer

The invention claimed is:

1. An image processing apparatus, comprising:
a processor configured to:
calculate a controlling value based on a first white balance gain and a second white balance gain, wherein
each of the first white balance gain and the second white balance gain is for adjustment of a tint of a light source at a time of capture of an image,
the first white balance gain is for the adjustment, of the tint of the light source, in a direction of cancelation of the tint,
the second white balance gain is for the adjustment, of the tint of the light source, in a direction that leaves the tint uncancelled, and
the calculated controlling value indicates a tint remaining amount of the tint of the light source; and
modulate an image processing parameter based on the calculated controlling value.

2. The image processing apparatus according to claim 1, wherein
the processor is further configured to execute a process of calculation of the first white balance gain, and
the process of the calculation of the first white balance gain is executed based on the image.

3. The image processing apparatus according to claim 1, wherein
the processor is further configured to execute a process of calculation of the second white balance gain, and
the process of the calculation of the second white balance gain is executed based on the image.

4. The image processing apparatus according to claim 1, wherein
the processor is further configured to execute a process on image data of the image based on the modulated image processing parameter.

5. The image processing apparatus according to claim 1, wherein
the processor is further configured to execute a process to output the modulated image processing parameter as information for storage in a storage medium.

6. The image processing apparatus according to claim 1, wherein
the processor is further configured to execute a process to output the modulated image processing parameter as information for transmission to an external apparatus.

7. The image processing apparatus according to claim 1, wherein
the processor is further configured to set the second white balance gain based on user input information.

8. The image processing apparatus according to claim 1, wherein the processor is further configured to:
control analysis of the image;
calculate of the controlling value based on the analysis of the image; and
modulate the image processing parameter based on the analysis of the image.

9. The image processing apparatus according to claim 4, wherein the processor is further configured to:
identify an area within the image; and
execute a signal process on the identified area based on the modulated image processing parameter.

10. The image processing apparatus according to claim 1, wherein
the processor is further configured to each of calculate the controlling value and modulate the image processing parameter based on an operating state of a light-emitting apparatus at the time of the capture of the image.

11. The image processing apparatus according to claim 1, wherein
the first white balance gain corresponds to a first white balance mode,
the second white balance gain corresponds to a second white balance mode, and
the processor is further configured to calculate the controlling value based on selection of the second white balance mode for white balance adjustment of the image.

12. The image processing apparatus according to claim 1, wherein the modulated image processing parameter includes a parameter for a color process on image data of the image.

13. The image processing apparatus according to claim 1, wherein
the modulated image processing parameter includes a parameter for a process of modulation of a specific hue of image data of the image.

14. The image processing apparatus according to claim 1, wherein
the modulated image processing parameter includes a parameter for a development process different from a color process.

15. An image processing method, comprising:
calculating a controlling value based on a first white balance gain and a second white balance gain, wherein
each of the first white balance gain and the second white balance gain is for adjustment of a tint of a light source at a time of capture of an image,
the first white balance gain is for the adjustment, of the tint of the light source, in a direction of cancelation of the tint,
the second white balance gain is for the adjustment, of the tint of the light source, in a direction that leaves the tint uncancelled, and
the calculated controlling value indicates a tint remaining amount of the tint of the light source; and
modulating an image processing parameter based on the calculated controlling value.

16. A non-transitory computer-readable medium having stored thereon computer-executable instructions which, when executed by a computer, cause the computer to execute operations, the operations, comprising:
calculating a controlling value based on a first white balance gain and a second white balance gain, wherein
each of the first white balance gain and the second white balance gain is for adjustment of a tint of a light source at a time of capture of an image,
the first white balance gain is for the adjustment, of the tint of the light source, in a direction of cancelation of the tint,
the second white balance gain is for the adjustment, of the tint of the light source, in a direction that leaves the tint uncancelled, and
the calculated controlling value indicates a tint remaining amount of the tint of the light source; and
modulating an image processing parameter based on the calculated controlling value.

17. The non-transitory computer-readable medium according to claim 16, further comprising
executing a process for calculation of the first white balance gain, wherein the process for the calculation of the first white balance gain is executed based on the image.

18. The non-transitory computer-readable medium according to claim 16, further comprising
executing a process for calculation of the second white balance gain, wherein the process for the calculation of the second white balance gain is executed based on the image.

* * * * *